United States Patent
Deninger et al.

(10) Patent No.: US 9,602,548 B2
(45) Date of Patent: *Mar. 21, 2017

(54) SYSTEM AND METHOD FOR INTELLIGENT STATE MANAGEMENT

(71) Applicant: McAfee, Inc., Santa Clara, CA (US)

(72) Inventors: William Deninger, Millbrae, CA (US); Ratinder Paul Singh Ahuja, Saratoga, CA (US); Lee C. Cheung, Santa Clara, CA (US)

(73) Assignee: McAfee, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,587

(22) Filed: Nov. 16, 2015

(65) Prior Publication Data

US 2016/0142442 A1 May 19, 2016

Related U.S. Application Data

(60) Continuation of application No. 13/436,275, filed on Mar. 30, 2012, now Pat. No. 9,195,937, which is a
(Continued)

(51) Int. Cl.
*G06F 17/00* (2006.01)
*G06N 5/02* (2006.01)
(Continued)

(52) U.S. Cl.
CPC ........ *H04L 63/20* (2013.01); *G06F 17/30082* (2013.01); *G06N 5/02* (2013.01)

(58) Field of Classification Search
USPC .......................................................... 706/47
See application file for complete search history.

(56) References Cited

U.S. PATENT DOCUMENTS

| 4,286,255 A | 8/1981 | Siy |
| 4,710,957 A | 12/1987 | Bocci et al. |

(Continued)

FOREIGN PATENT DOCUMENTS

| CN | 101192237 | 6/2012 |
| EP | 2499806 | 9/2012 |

(Continued)

OTHER PUBLICATIONS

Analysis of Stroke Intersection for Overlapping PGF Elements Yan Chen; Xiaoqing Lu; Jingwei Qu; Zhi Tang 2016 12th IAPR Workshop on Document Analysis Systems (DAS) Year: 2016 pp. 245-250, DOI: 10.1109/DAS.2016.11 IEEE Conference Publications.*

(Continued)

*Primary Examiner* — Michael B Holmes
(74) *Attorney, Agent, or Firm* — Patent Capital Group

(57) ABSTRACT

A method is provided in one example embodiment and it includes receiving a state request and determining whether a state exists in a translation dictionary for the state request. The method further includes reproducing the state if it is not in the dictionary and adding a new state to the dictionary. In more specific embodiments, the method includes compiling a rule, based on the state, into a given state table. The rule affects data management for one or more documents that satisfy the rule. In yet other embodiments, the method includes determining that the state represents a final state such that a descriptor is added to the state. In one example, if the state is not referenced in the algorithm, then the state is released. If the state is referenced in the algorithm, then the state is replaced with the new state.

20 Claims, 29 Drawing Sheets

Related U.S. Application Data division of application No. 12/358,399, filed on Feb. 25, 2009, now Pat. No. 8,473,442.

(51) Int. Cl.
*H04L 29/06* (2006.01)
*G06F 17/30* (2006.01)

(56) References Cited

U.S. PATENT DOCUMENTS

| | | |
|---|---|---|
| 5,249,289 A | 9/1993 | Thamm et al. |
| 5,465,299 A | 11/1995 | Matsumoto et al. |
| 5,479,654 A | 12/1995 | Squibb |
| 5,497,489 A | 3/1996 | Menne |
| 5,542,090 A | 7/1996 | Henderson et al. |
| 5,557,747 A | 9/1996 | Rogers et al. |
| 5,577,249 A | 11/1996 | Califano |
| 5,623,652 A | 4/1997 | Vora et al. |
| 5,768,578 A | 6/1998 | Kirk |
| 5,781,629 A | 7/1998 | Haber et al. |
| 5,787,232 A | 7/1998 | Greiner et al. |
| 5,794,052 A | 8/1998 | Harding |
| 5,813,009 A | 9/1998 | Johnson et al. |
| 5,873,081 A | 2/1999 | Harel |
| 5,924,096 A | 7/1999 | Draper et al. |
| 5,937,422 A | 8/1999 | Nelson et al. |
| 5,943,670 A | 8/1999 | Prager |
| 5,987,610 A | 11/1999 | Franczek et al. |
| 5,995,111 A | 11/1999 | Morioka et al. |
| 6,026,411 A | 2/2000 | Delp |
| 6,073,142 A | 6/2000 | Geiger et al. |
| 6,078,953 A | 6/2000 | Vaid et al. |
| 6,094,531 A | 7/2000 | Allison et al. |
| 6,108,697 A | 8/2000 | Raymond et al. |
| 6,122,379 A | 9/2000 | Barbir |
| 6,161,102 A | 12/2000 | Yanagihara et al. |
| 6,175,867 B1 | 1/2001 | Taghadoss |
| 6,192,472 B1 | 2/2001 | Garay et al. |
| 6,243,091 B1 | 6/2001 | Berstis |
| 6,243,720 B1 | 6/2001 | Munter et al. |
| 6,278,992 B1 | 8/2001 | Curtis et al. |
| 6,292,810 B1 | 9/2001 | Richards |
| 6,336,186 B1 | 1/2002 | Dyksterhouse et al. |
| 6,343,376 B1 | 1/2002 | Saxe et al. |
| 6,356,885 B2 | 3/2002 | Ross et al. |
| 6,363,488 B1 | 3/2002 | Ginter et al. |
| 6,389,405 B1 | 5/2002 | Oatman et al. |
| 6,389,419 B1 | 5/2002 | Wong et al. |
| 6,408,294 B1 | 6/2002 | Getchius et al. |
| 6,408,301 B1 | 6/2002 | Patton et al. |
| 6,411,952 B1 | 6/2002 | Bharat et al. |
| 6,457,017 B2 | 9/2002 | Watkins et al. |
| 6,460,050 B1 | 10/2002 | Pace et al. |
| 6,493,761 B1 | 12/2002 | Baker et al. |
| 6,499,105 B1 | 12/2002 | Yoshiura et al. |
| 6,502,091 B1 | 12/2002 | Chundi et al. |
| 6,515,681 B1 | 2/2003 | Knight |
| 6,516,320 B1 | 2/2003 | Odom et al. |
| 6,523,026 B1 | 2/2003 | Gillis |
| 6,539,024 B1 | 3/2003 | Janoska et al. |
| 6,556,964 B2 | 4/2003 | Haug et al. |
| 6,556,983 B1 | 4/2003 | Altschuler et al. |
| 6,571,275 B1 | 5/2003 | Dong et al. |
| 6,584,458 B1 | 6/2003 | Millett et al. |
| 6,598,033 B2 | 7/2003 | Ross et al. |
| 6,629,097 B1 | 9/2003 | Keith |
| 6,662,176 B2 | 12/2003 | Brunet et al. |
| 6,665,662 B1 | 12/2003 | Kirkwood et al. |
| 6,675,159 B1 | 1/2004 | Lin et al. |
| 6,691,209 B1 | 2/2004 | O'Connell |
| 6,754,647 B1 | 6/2004 | Tackett et al. |
| 6,757,646 B2 | 6/2004 | Marchisio |
| 6,771,595 B1 | 8/2004 | Gilbert et al. |
| 6,772,214 B1 | 8/2004 | McClain et al. |
| 6,785,815 B1 | 8/2004 | Serret-Avila et al. |
| 6,804,627 B1 | 10/2004 | Marokhovsky et al. |
| 6,820,082 B1 | 11/2004 | Cook et al. |
| 6,857,011 B2 | 2/2005 | Reinke |
| 6,937,257 B1 | 8/2005 | Dunlavey |
| 6,950,864 B1 | 9/2005 | Tsuchiya |
| 6,976,053 B1 | 12/2005 | Tripp et al. |
| 6,978,297 B1 | 12/2005 | Piersol |
| 6,978,367 B1 | 12/2005 | Hind et al. |
| 7,007,020 B1 | 2/2006 | Chen et al. |
| 7,020,654 B1 | 3/2006 | Najmi |
| 7,020,661 B1 | 3/2006 | Cruanes et al. |
| 7,062,572 B1 | 6/2006 | Hampton |
| 7,062,705 B1 | 6/2006 | Kirkwood et al. |
| 7,072,967 B1 | 7/2006 | Saulpaugh et al. |
| 7,082,443 B1 | 7/2006 | Ashby |
| 7,093,288 B1 | 8/2006 | Hydrie et al. |
| 7,103,607 B1 | 9/2006 | Kirkwood et al. |
| 7,130,587 B2 | 10/2006 | Hikokubo et al. |
| 7,133,400 B1 | 11/2006 | Henderson et al. |
| 7,139,973 B1 | 11/2006 | Kirkwood et al. |
| 7,143,109 B2 | 11/2006 | Nagral et al. |
| 7,158,983 B2 | 1/2007 | Willse et al. |
| 7,165,175 B1 | 1/2007 | Kollmyer et al. |
| 7,171,662 B1 | 1/2007 | Misra et al. |
| 7,181,769 B1 | 2/2007 | Keanini et al. |
| 7,185,073 B1 | 2/2007 | Gai et al. |
| 7,185,192 B1 | 2/2007 | Kahn |
| 7,188,173 B2 | 3/2007 | Anderson et al. |
| 7,194,483 B1 | 3/2007 | Mohan et al. |
| 7,219,131 B2 | 5/2007 | Banister et al. |
| 7,219,134 B2 | 5/2007 | Takeshima et al. |
| 7,243,120 B2 | 7/2007 | Massey |
| 7,246,236 B2 | 7/2007 | Stirbu |
| 7,254,562 B2 | 8/2007 | Hsu et al. |
| 7,254,632 B2 | 8/2007 | Zeira et al. |
| 7,266,845 B2 | 9/2007 | Hypponen |
| 7,272,724 B2 | 9/2007 | Tarbotton et al. |
| 7,277,957 B2 | 10/2007 | Rowley et al. |
| 7,290,048 B1 | 10/2007 | Barnett et al. |
| 7,293,067 B1 | 11/2007 | Maki et al. |
| 7,293,238 B1 | 11/2007 | Brook et al. |
| 7,296,011 B2 | 11/2007 | Chaudhuri et al. |
| 7,296,070 B2 | 11/2007 | Sweeney et al. |
| 7,296,088 B1 | 11/2007 | Padmanabhan et al. |
| 7,296,232 B1 | 11/2007 | Burdick et al. |
| 7,299,277 B1 | 11/2007 | Moran et al. |
| 7,299,489 B1 | 11/2007 | Branigan et al. |
| 7,373,500 B2 | 5/2008 | Ramelson et al. |
| 7,424,744 B1 | 9/2008 | Wu et al. |
| 7,426,181 B1 | 9/2008 | Feroz et al. |
| 7,434,058 B2 | 10/2008 | Ahuja et al. |
| 7,467,202 B2 | 12/2008 | Savchuk |
| 7,477,780 B2 | 1/2009 | Boncyk et al. |
| 7,483,916 B2 | 1/2009 | Lowe et al. |
| 7,493,659 B1 | 2/2009 | Wu et al. |
| 7,505,463 B2 | 3/2009 | Schuba et al. |
| 7,506,055 B2 | 3/2009 | McClain et al. |
| 7,506,155 B1 | 3/2009 | Stewart et al. |
| 7,509,677 B2 | 3/2009 | Saurabh et al. |
| 7,516,492 B1 | 4/2009 | Nisbet et al. |
| 7,539,683 B1 | 5/2009 | Satoh et al. |
| 7,551,629 B2 | 6/2009 | Chen et al. |
| 7,577,154 B1 | 8/2009 | Yung et al. |
| 7,581,059 B2 | 8/2009 | Gupta et al. |
| 7,596,571 B2 | 9/2009 | Sifry |
| 7,599,844 B2 | 10/2009 | King et al. |
| 7,657,104 B2 | 2/2010 | Deninger et al. |
| 7,664,083 B1 | 2/2010 | Cermak et al. |
| 7,685,254 B2 | 3/2010 | Pandya |
| 7,689,614 B2 | 3/2010 | de la Iglesia et al. |
| 7,730,011 B1 | 6/2010 | Deninger et al. |
| 7,739,080 B1 | 6/2010 | Beck et al. |
| 7,760,730 B2 | 7/2010 | Goldschmidt et al. |
| 7,760,769 B1 | 7/2010 | Lovett et al. |
| 7,774,604 B2 | 8/2010 | Lowe et al. |
| 7,801,852 B2 | 9/2010 | Wong et al. |
| 7,814,327 B2 | 10/2010 | Ahuja et al. |
| 7,818,326 B2 | 10/2010 | Deninger et al. |
| 7,844,582 B1 | 11/2010 | Arbilla et al. |

(56) References Cited

U.S. PATENT DOCUMENTS

| | | |
|---|---|---|
| 7,849,065 B2 | 12/2010 | Kamani et al. |
| 7,886,359 B2 | 2/2011 | Jones et al. |
| 7,899,828 B2 | 3/2011 | de la Iglesia et al. |
| 7,907,608 B2 | 3/2011 | Liu et al. |
| 7,921,072 B2 | 4/2011 | Bohannon et al. |
| 7,926,099 B1 | 4/2011 | Chakravarty et al. |
| 7,930,540 B2 | 4/2011 | Ahuja et al. |
| 7,949,849 B2 | 5/2011 | Lowe et al. |
| 7,958,227 B2 | 6/2011 | Ahuja et al. |
| 7,962,591 B2 | 6/2011 | Deninger et al. |
| 7,979,524 B2 | 7/2011 | Dieberger et al. |
| 7,984,175 B2 | 7/2011 | de la Iglesia et al. |
| 7,996,373 B1 | 8/2011 | Zoppas et al. |
| 8,005,863 B2 | 8/2011 | de la Iglesia et al. |
| 8,010,689 B2 | 8/2011 | Deninger et al. |
| 8,046,372 B1 | 10/2011 | Thirumalai et al. |
| 8,055,601 B2 | 11/2011 | Pandya |
| 8,056,130 B1 | 11/2011 | Njemanze et al. |
| 8,065,739 B1 | 11/2011 | Bruening et al. |
| 8,166,307 B2 | 4/2012 | Ahuja et al. |
| 8,176,049 B2 | 5/2012 | Deninger et al. |
| 8,200,026 B2 | 6/2012 | Deninger et al. |
| 8,205,242 B2 | 6/2012 | Liu et al. |
| 8,205,244 B2 | 6/2012 | Nightingale et al. |
| 8,261,347 B2 | 9/2012 | Hrabik et al. |
| 8,271,794 B2 | 9/2012 | Lowe et al. |
| 8,286,253 B1 | 10/2012 | Lu et al. |
| 8,301,635 B2 | 10/2012 | de la Iglesia et al. |
| 8,307,007 B2 | 11/2012 | de la Iglesia et al. |
| 8,307,206 B2 | 11/2012 | Ahuja et al. |
| 8,341,734 B1 | 12/2012 | Hernacki et al. |
| 8,463,800 B2 | 6/2013 | Deninger et al. |
| 8,473,442 B1 | 6/2013 | Deninger et al. |
| 8,504,537 B2 | 8/2013 | de la Iglesia et al. |
| 8,521,757 B1 | 8/2013 | Nanda et al. |
| 8,560,534 B2 | 10/2013 | Lowe et al. |
| 8,601,537 B2 | 12/2013 | Liu et al. |
| 8,612,570 B1 | 12/2013 | Nair et al. |
| 8,635,706 B2 | 1/2014 | Liu |
| 8,645,397 B1 | 2/2014 | Koudas et al. |
| 8,656,039 B2 | 2/2014 | de la Iglesia et al. |
| 8,667,121 B2 * | 3/2014 | Ahuja .................... H04L 63/20 709/224 |
| 8,683,035 B2 * | 3/2014 | Ahuja .................... H04L 43/50 707/748 |
| 8,700,561 B2 * | 4/2014 | Ahuja ............... G06F 17/30713 707/603 |
| 8,706,709 B2 * | 4/2014 | Ahuja ............... G06F 17/30737 707/705 |
| 8,707,008 B2 | 4/2014 | Lowe et al. |
| 8,730,955 B2 * | 5/2014 | Liu ...................... H04L 67/125 370/389 |
| 8,762,386 B2 * | 6/2014 | de la Iglesia ....... H04L 63/1425 707/741 |
| 8,806,615 B2 * | 8/2014 | Ahuja ................. H04L 63/0853 380/44 |
| 8,850,591 B2 * | 9/2014 | Ahuja ............... G06F 17/30613 707/765 |
| 8,918,359 B2 | 12/2014 | Ahuja et al. |
| 9,092,471 B2 | 7/2015 | de la Iglesia et al. |
| 9,094,338 B2 * | 7/2015 | Ahuja .................... H04L 43/18 |
| 9,195,937 B2 * | 11/2015 | Deninger ................ G06N 5/02 |
| 9,326,134 B2 * | 4/2016 | Ahuja .................. H04W 4/021 |
| 9,374,225 B2 * | 6/2016 | Ahuja ................. H04L 9/3247 |
| 9,430,564 B2 * | 8/2016 | Ahuja ............... G06F 17/30713 |
| 2001/0010717 A1 | 8/2001 | Goto et al. |
| 2001/0013024 A1 | 8/2001 | Takahashi et al. |
| 2001/0032310 A1 | 10/2001 | Corella |
| 2001/0037324 A1 | 11/2001 | Agrawal et al. |
| 2001/0046230 A1 | 11/2001 | Rojas |
| 2002/0032677 A1 | 3/2002 | Morgenthaler et al. |
| 2002/0032772 A1 | 3/2002 | Olstad et al. |
| 2002/0046221 A1 | 4/2002 | Wallace et al. |
| 2002/0052896 A1 | 5/2002 | Streit et al. |
| 2002/0065956 A1 | 5/2002 | Yagawa et al. |
| 2002/0078355 A1 | 6/2002 | Samar |
| 2002/0091579 A1 | 7/2002 | Yehia et al. |
| 2002/0103799 A1 | 8/2002 | Bradford et al. |
| 2002/0103876 A1 | 8/2002 | Chatani et al. |
| 2002/0107843 A1 | 8/2002 | Biebesheimer et al. |
| 2002/0116124 A1 | 8/2002 | Garin et al. |
| 2002/0116721 A1 | 8/2002 | Dobes et al. |
| 2002/0126673 A1 | 9/2002 | Dagli et al. |
| 2002/0128903 A1 | 9/2002 | Kernahan |
| 2002/0129140 A1 | 9/2002 | Peled et al. |
| 2002/0159447 A1 | 10/2002 | Carey et al. |
| 2003/0009718 A1 | 1/2003 | Wolfgang et al. |
| 2003/0028493 A1 | 2/2003 | Tajima |
| 2003/0028774 A1 | 2/2003 | Meka |
| 2003/0046369 A1 | 3/2003 | Sim et al. |
| 2003/0053420 A1 | 3/2003 | Duckett et al. |
| 2003/0055962 A1 | 3/2003 | Freund et al. |
| 2003/0065571 A1 | 4/2003 | Dutta |
| 2003/0084300 A1 | 5/2003 | Koike |
| 2003/0084318 A1 | 5/2003 | Schertz |
| 2003/0084326 A1 | 5/2003 | Tarquini |
| 2003/0093678 A1 | 5/2003 | Bowe et al. |
| 2003/0099243 A1 | 5/2003 | Oh et al. |
| 2003/0105716 A1 | 6/2003 | Sutton et al. |
| 2003/0105739 A1 | 6/2003 | Essafi et al. |
| 2003/0105854 A1 | 6/2003 | Thorsteinsson et al. |
| 2003/0131116 A1 | 7/2003 | Jain et al. |
| 2003/0135612 A1 | 7/2003 | Huntington et al. |
| 2003/0167392 A1 | 9/2003 | Fransdonk |
| 2003/0185220 A1 | 10/2003 | Valenci |
| 2003/0196081 A1 | 10/2003 | Savarda et al. |
| 2003/0204741 A1 | 10/2003 | Schoen et al. |
| 2003/0210694 A1 | 11/2003 | Jayaraman et al. |
| 2003/0221101 A1 | 11/2003 | Micali |
| 2003/0225796 A1 | 12/2003 | Matsubara |
| 2003/0225841 A1 | 12/2003 | Song et al. |
| 2003/0231632 A1 | 12/2003 | Haeberlen |
| 2003/0233411 A1 | 12/2003 | Parry et al. |
| 2004/0001498 A1 | 1/2004 | Chen et al. |
| 2004/0003005 A1 | 1/2004 | Chaudhuri et al. |
| 2004/0010484 A1 | 1/2004 | Foulger et al. |
| 2004/0015579 A1 | 1/2004 | Cooper et al. |
| 2004/0036716 A1 | 2/2004 | Jordahl |
| 2004/0054779 A1 | 3/2004 | Takeshima et al. |
| 2004/0059736 A1 | 3/2004 | Willse et al. |
| 2004/0059920 A1 | 3/2004 | Godwin |
| 2004/0064537 A1 | 4/2004 | Anderson et al. |
| 2004/0071164 A1 | 4/2004 | Baum |
| 2004/0093323 A1 | 5/2004 | Bluhm et al. |
| 2004/0111406 A1 | 6/2004 | Udeshi et al. |
| 2004/0111678 A1 | 6/2004 | Hara |
| 2004/0114518 A1 | 6/2004 | MacFaden et al. |
| 2004/0117414 A1 | 6/2004 | Braun et al. |
| 2004/0120325 A1 | 6/2004 | Ayres |
| 2004/0122863 A1 | 6/2004 | Sidman |
| 2004/0122936 A1 | 6/2004 | Mizelle et al. |
| 2004/0139061 A1 | 7/2004 | Colossi et al. |
| 2004/0139120 A1 | 7/2004 | Clark et al. |
| 2004/0143598 A1 | 7/2004 | Drucker et al. |
| 2004/0181513 A1 | 9/2004 | Henderson et al. |
| 2004/0181690 A1 | 9/2004 | Rothermel et al. |
| 2004/0193594 A1 | 9/2004 | Moore et al. |
| 2004/0194141 A1 | 9/2004 | Sanders |
| 2004/0196970 A1 | 10/2004 | Cole |
| 2004/0205457 A1 | 10/2004 | Bent et al. |
| 2004/0215502 A1 | 10/2004 | Brody |
| 2004/0215626 A1 | 10/2004 | Colossi et al. |
| 2004/0220944 A1 | 11/2004 | Behrens et al. |
| 2004/0225645 A1 | 11/2004 | Rowney et al. |
| 2004/0230572 A1 | 11/2004 | Omoigui |
| 2004/0230891 A1 | 11/2004 | Pravetz et al. |
| 2004/0249781 A1 | 12/2004 | Anderson |
| 2004/0267753 A1 | 12/2004 | Hoche |
| 2005/0004911 A1 | 1/2005 | Goldberg et al. |
| 2005/0021715 A1 | 1/2005 | Dugatkin et al. |
| 2005/0021743 A1 | 1/2005 | Fleig et al. |
| 2005/0022114 A1 | 1/2005 | Shanahan et al. |
| 2005/0027881 A1 | 2/2005 | Figueira et al. |

(56) References Cited

U.S. PATENT DOCUMENTS

| | | |
|---|---|---|
| 2005/0033726 A1 | 2/2005 | Wu et al. |
| 2005/0033747 A1 | 2/2005 | Wittkotter |
| 2005/0033803 A1 | 2/2005 | Vleet et al. |
| 2005/0038788 A1 | 2/2005 | Dettinger et al. |
| 2005/0038809 A1 | 2/2005 | Abajian et al. |
| 2005/0044289 A1 | 2/2005 | Hendel et al. |
| 2005/0050028 A1 | 3/2005 | Rose et al. |
| 2005/0050205 A1 | 3/2005 | Gordy et al. |
| 2005/0055327 A1 | 3/2005 | Agrawal et al. |
| 2005/0055399 A1 | 3/2005 | Savchuk |
| 2005/0075103 A1 | 4/2005 | Hikokubo et al. |
| 2005/0086252 A1 | 4/2005 | Jones et al. |
| 2005/0091443 A1 | 4/2005 | Hershkovich et al. |
| 2005/0091532 A1 | 4/2005 | Moghe |
| 2005/0097441 A1 | 5/2005 | Herbach et al. |
| 2005/0108244 A1 | 5/2005 | Riise et al. |
| 2005/0114452 A1 | 5/2005 | Prakash |
| 2005/0120006 A1 | 6/2005 | Nye |
| 2005/0127171 A1 | 6/2005 | Ahuja et al. |
| 2005/0128242 A1 | 6/2005 | Suzuki |
| 2005/0131876 A1 | 6/2005 | Ahuja et al. |
| 2005/0132034 A1 | 6/2005 | de la Iglesia et al. |
| 2005/0132046 A1 | 6/2005 | de la Iglesia et al. |
| 2005/0132079 A1 | 6/2005 | de la Iglesia et al. |
| 2005/0132197 A1 | 6/2005 | Medlar |
| 2005/0132198 A1 | 6/2005 | Ahuja et al. |
| 2005/0132297 A1 | 6/2005 | Milic-Frayling et al. |
| 2005/0138110 A1 | 6/2005 | Redlich et al. |
| 2005/0138242 A1 | 6/2005 | Pope et al. |
| 2005/0138279 A1 | 6/2005 | Somasundaram |
| 2005/0149494 A1 | 7/2005 | Lindh et al. |
| 2005/0149504 A1 | 7/2005 | Ratnaparkhi |
| 2005/0166066 A1 | 7/2005 | Ahuja et al. |
| 2005/0177725 A1 | 8/2005 | Lowe et al. |
| 2005/0180341 A1 | 8/2005 | Nelson et al. |
| 2005/0182765 A1 | 8/2005 | Liddy |
| 2005/0188218 A1 | 8/2005 | Walmsley et al. |
| 2005/0203940 A1 | 9/2005 | Farrar et al. |
| 2005/0204129 A1 | 9/2005 | Sudia et al. |
| 2005/0228864 A1 | 10/2005 | Robertson |
| 2005/0235153 A1 | 10/2005 | Ikeda |
| 2005/0262044 A1 | 11/2005 | Chaudhuri et al. |
| 2005/0273614 A1 | 12/2005 | Ahuja et al. |
| 2005/0289181 A1 | 12/2005 | Deninger et al. |
| 2006/0005247 A1 | 1/2006 | Zhang et al. |
| 2006/0021045 A1 | 1/2006 | Cook |
| 2006/0021050 A1 | 1/2006 | Cook et al. |
| 2006/0036593 A1 | 2/2006 | Dean |
| 2006/0037072 A1 | 2/2006 | Rao et al. |
| 2006/0041560 A1 | 2/2006 | Forman et al. |
| 2006/0041570 A1 | 2/2006 | Lowe et al. |
| 2006/0041760 A1 | 2/2006 | Huang |
| 2006/0047675 A1 | 3/2006 | Lowe et al. |
| 2006/0075228 A1 | 4/2006 | Black et al. |
| 2006/0080130 A1 | 4/2006 | Choksi |
| 2006/0083180 A1 | 4/2006 | Baba et al. |
| 2006/0106793 A1 | 5/2006 | Liang |
| 2006/0106866 A1 | 5/2006 | Green et al. |
| 2006/0150249 A1 | 7/2006 | Gassen et al. |
| 2006/0167896 A1 | 7/2006 | Kapur et al. |
| 2006/0184532 A1 | 8/2006 | Hamada et al. |
| 2006/0235811 A1 | 10/2006 | Fairweather |
| 2006/0242126 A1 | 10/2006 | Fitzhugh |
| 2006/0242313 A1 | 10/2006 | Le et al. |
| 2006/0242694 A1 | 10/2006 | Gold |
| 2006/0251109 A1 | 11/2006 | Muller et al. |
| 2006/0253445 A1 | 11/2006 | Huang et al. |
| 2006/0271506 A1 | 11/2006 | Bohannon et al. |
| 2006/0272024 A1 | 11/2006 | Huang et al. |
| 2006/0288216 A1 | 12/2006 | Buhler et al. |
| 2007/0006293 A1 | 1/2007 | Balakrishnan et al. |
| 2007/0011309 A1 | 1/2007 | Brady et al. |
| 2007/0028039 A1 | 2/2007 | Gupta et al. |
| 2007/0036156 A1 | 2/2007 | Liu et al. |
| 2007/0039049 A1 | 2/2007 | Kupferman et al. |
| 2007/0050334 A1 | 3/2007 | Deninger et al. |
| 2007/0050381 A1 | 3/2007 | Hu et al. |
| 2007/0050467 A1 | 3/2007 | Borrett et al. |
| 2007/0050846 A1 | 3/2007 | Xie et al. |
| 2007/0081471 A1 | 4/2007 | Talley et al. |
| 2007/0094394 A1 | 4/2007 | Singh et al. |
| 2007/0106660 A1 | 5/2007 | Stern et al. |
| 2007/0106685 A1 | 5/2007 | Houh et al. |
| 2007/0106693 A1 | 5/2007 | Houh et al. |
| 2007/0110089 A1 | 5/2007 | Essafi et al. |
| 2007/0112837 A1 | 5/2007 | Houh et al. |
| 2007/0112838 A1 | 5/2007 | Bjarnestam et al. |
| 2007/0116366 A1 | 5/2007 | Deninger et al. |
| 2007/0124384 A1 | 5/2007 | Howell et al. |
| 2007/0136599 A1 | 6/2007 | Suga |
| 2007/0139723 A1 | 6/2007 | Beadle et al. |
| 2007/0140128 A1 | 6/2007 | Klinker et al. |
| 2007/0143235 A1 | 6/2007 | Kummamuru et al. |
| 2007/0143559 A1 | 6/2007 | Yagawa |
| 2007/0162609 A1 | 7/2007 | Pope et al. |
| 2007/0162954 A1 | 7/2007 | Pela |
| 2007/0185868 A1 | 8/2007 | Roth et al. |
| 2007/0220607 A1 | 9/2007 | Sprosts et al. |
| 2007/0226504 A1 | 9/2007 | de la Iglesia et al. |
| 2007/0226510 A1 | 9/2007 | de la Iglesia et al. |
| 2007/0248029 A1 | 10/2007 | Merkey et al. |
| 2007/0260643 A1 | 11/2007 | Borden et al. |
| 2007/0266044 A1 | 11/2007 | Grondin et al. |
| 2007/0271254 A1 | 11/2007 | de la Iglesia et al. |
| 2007/0271371 A1 | 11/2007 | Singh Ahuja et al. |
| 2007/0271372 A1 | 11/2007 | Deninger et al. |
| 2007/0280123 A1 | 12/2007 | Atkins et al. |
| 2008/0010256 A1 | 1/2008 | Lindblad |
| 2008/0027971 A1 | 1/2008 | Statchuk |
| 2008/0028467 A1 | 1/2008 | Kommareddy et al. |
| 2008/0030383 A1 | 2/2008 | Cameron |
| 2008/0071813 A1 | 3/2008 | Nair et al. |
| 2008/0082497 A1 | 4/2008 | Leblang et al. |
| 2008/0091408 A1 | 4/2008 | Roulland et al. |
| 2008/0112411 A1 | 5/2008 | Stafford et al. |
| 2008/0115125 A1 | 5/2008 | Stafford et al. |
| 2008/0127346 A1 | 5/2008 | Oh et al. |
| 2008/0140657 A1 | 6/2008 | Azvine et al. |
| 2008/0141117 A1 | 6/2008 | King et al. |
| 2008/0159627 A1 | 7/2008 | Sengamedu |
| 2008/0235163 A1 | 9/2008 | Balasubramanian et al. |
| 2008/0263019 A1 | 10/2008 | Harrison et al. |
| 2008/0270462 A1 | 10/2008 | Thomsen |
| 2008/0276295 A1 | 11/2008 | Nair |
| 2009/0070327 A1 | 3/2009 | Loeser et al. |
| 2009/0070328 A1 | 3/2009 | Loeser et al. |
| 2009/0070459 A1 | 3/2009 | Cho et al. |
| 2009/0100055 A1 | 4/2009 | Wang |
| 2009/0157659 A1 | 6/2009 | Satoh et al. |
| 2009/0158430 A1 | 6/2009 | Borders |
| 2009/0178110 A1 | 7/2009 | Higuchi |
| 2009/0187568 A1 | 7/2009 | Morin |
| 2009/0193033 A1 | 7/2009 | Ramzan et al. |
| 2009/0216752 A1 | 8/2009 | Terui et al. |
| 2009/0222442 A1 | 9/2009 | Houh et al. |
| 2009/0232391 A1 | 9/2009 | Deninger et al. |
| 2009/0235150 A1 | 9/2009 | Berry |
| 2009/0254516 A1 | 10/2009 | Meiyyappan |
| 2009/0254532 A1 | 10/2009 | Yang et al. |
| 2009/0271367 A1 | 10/2009 | Dharawat |
| 2009/0288026 A1 | 11/2009 | Barabas et al. |
| 2009/0288164 A1 | 11/2009 | Adelstein et al. |
| 2009/0300709 A1 | 12/2009 | Chen et al. |
| 2009/0326925 A1 | 12/2009 | Crider et al. |
| 2010/0011016 A1 | 1/2010 | Greene |
| 2010/0011410 A1 | 1/2010 | Liu |
| 2010/0023726 A1 | 1/2010 | Aviles |
| 2010/0037324 A1 | 2/2010 | Grant et al. |
| 2010/0042625 A1 | 2/2010 | Zoellner et al. |
| 2010/0088317 A1 | 4/2010 | Bone et al. |
| 2010/0100551 A1 | 4/2010 | Knauft et al. |
| 2010/0121853 A1 | 5/2010 | de la Iglesia et al. |
| 2010/0174528 A1 | 7/2010 | Oya et al. |
| 2010/0185622 A1 | 7/2010 | Deninger et al. |

(56) References Cited

U.S. PATENT DOCUMENTS

| | | |
|---|---|---|
| 2010/0191732 A1 | 7/2010 | Lowe et al. |
| 2010/0195909 A1 | 8/2010 | Wasson et al. |
| 2010/0268959 A1 | 10/2010 | Lowe et al. |
| 2010/0332502 A1 | 12/2010 | Carmel et al. |
| 2011/0004599 A1 | 1/2011 | Deninger et al. |
| 2011/0040552 A1 | 2/2011 | Van Guilder et al. |
| 2011/0106846 A1 | 5/2011 | Matsumoto et al. |
| 2011/0131199 A1 | 6/2011 | Simon et al. |
| 2011/0149959 A1 | 6/2011 | Liu et al. |
| 2011/0167212 A1 | 7/2011 | Lowe et al. |
| 2011/0167265 A1 | 7/2011 | Ahuja et al. |
| 2011/0196911 A1 | 8/2011 | de la Iglesia et al. |
| 2011/0197284 A1 | 8/2011 | Ahuja et al. |
| 2011/0208861 A1 | 8/2011 | Deninger et al. |
| 2011/0219237 A1 | 9/2011 | Ahuja et al. |
| 2011/0258197 A1 | 10/2011 | de la Iglesia et al. |
| 2011/0276575 A1 | 11/2011 | de la Iglesia et al. |
| 2011/0276709 A1 | 11/2011 | Deninger et al. |
| 2012/0114119 A1 | 5/2012 | Ahuja et al. |
| 2012/0179687 A1 | 7/2012 | Liu |
| 2012/0180137 A1 | 7/2012 | Liu |
| 2012/0191722 A1 | 7/2012 | Deninger et al. |
| 2013/0246334 A1 | 9/2013 | Ahuja et al. |
| 2013/0246335 A1 | 9/2013 | Ahuja et al. |
| 2013/0246336 A1 | 9/2013 | Ahuja et al. |
| 2013/0246337 A1 | 9/2013 | Ahuja et al. |
| 2013/0246338 A1 | 9/2013 | Doddapaneni |
| 2013/0246371 A1 | 9/2013 | Ahuja et al. |
| 2013/0246377 A1 | 9/2013 | Gaitonde |
| 2013/0246424 A1 | 9/2013 | Deninger et al. |
| 2013/0246431 A1 | 9/2013 | Ahuja et al. |
| 2013/0246925 A1 | 9/2013 | Ahuja et al. |
| 2013/0247208 A1 | 9/2013 | Bishop |
| 2013/0254838 A1 | 9/2013 | Ahuja et al. |
| 2014/0032919 A1 | 1/2014 | Ahuja et al. |
| 2014/0164314 A1 | 6/2014 | Ahuja et al. |
| 2014/0164442 A1 | 6/2014 | de la Iglesia |
| 2014/0289416 A1 | 9/2014 | Ahuja et al. |
| 2015/0067810 A1 | 3/2015 | Ahuja et al. |
| 2015/0106875 A1 | 4/2015 | Ahuja et al. |
| 2016/0142442 A1 | 5/2016 | Deninger |

FOREIGN PATENT DOCUMENTS

| | | |
|---|---|---|
| JP | 1994-098770 | 4/1994 |
| JP | 2005-209193 | 8/2005 |
| JP | 5727027 | 4/2015 |
| KR | 1020080087021 | 9/2008 |
| KR | 1020140041391 | 4/2014 |
| KR | 10-1538305 | 7/2015 |
| WO | 01-47205 | 6/2001 |
| WO | WO 01/99373 | 12/2001 |
| WO | WO 2004/008310 | 1/2004 |
| WO | 2011-080745 | 7/2011 |
| WO | WO 2012/060892 | 5/2012 |

OTHER PUBLICATIONS

Further Result on Distribution Properties of Compressing Sequences Derived From Primitive Sequences Over Qun-Xiong Zheng; Wen-Feng Qi; Tian Tian IEEE Transactions on Information Theory Year: 2013, vol. 59, Issue: 8 pp. 5016-5022, DOI: 10.1109/TIT.2013.2258712 IEEE Journals & Magazines.*

Integrated Modeling and Verification of Real-Time Systems through Multiple Paradigms Marcello M. Bersani; Carlo A. Furia; Matteo Pradella; Matteo Rossi 2009 Seventh IEEE International Conference on Software Engineering and Formal Methods Year: 2009 pp. 13-22, DOI: 10.1109/SEFM.2009.16 IEEE Conference Publications.*

Microsoft Outlook, Outlook, copyright 1995-2000, 2 pages.

Preneel, Bart, "Cryptographic Hash Functions", Proceedings of the 3rd Symposium on State and Progress of Research in Cryptography, 1993, pp. 161-171.

U.S. Appl. No. 11/254,436, filed Oct. 19, 2005, entitled "Attributes of Captured Objects in a Capture System," Inventor(s) William Deninger et al. (49 pages).

U.S. Appl. No. 11/900,964, filed Sep. 14, 2007, entitled "System and Method for Indexing a Capture System," Inventor(s) Ashok Doddapaneni et al. (54 pages).

U.S. Appl. No. 12/190,536, filed Aug. 12, 2008, entitled "Configuration Management for a Capture/Registration System," Inventor(s) Jitendra B. Gaitonde et al. (87 pages).

U.S. Appl. No. 12/352,720, filed Jan. 13, 2009, entitled "System and Method for Concept Building," Inventor(s) Ratinder Paul Singh Ahuja et al. (71 pages).

U.S. Appl. No. 12/354,688, filed Jan. 15, 2009, entitled "System and Method for Intelligent Term Grouping," Inventor(s) Ratinder Paul Ahuja et al. (82 pages).

U.S. Appl. No. 12/358,399, filed Jan. 23, 2009, entitled "System and Method for Intelligent State Management," Inventor(s) William Deninger et al. (74 pages).

U.S. Appl. No. 12/360,537, filed Jan. 27, 2009, entitled "Database for a Capture System," Inventor(s) Rick Lowe et al. (38 pages).

U.S. Appl. No. 12/410,875, filed Mar. 25, 2009, entitled "System and Method for Data Mining and Security Policy Management," Inventor(s) Ratinder Paul Singh Ahuja et al. (69 pages).

U.S. Appl. No. 12/410,905, filed Mar. 25, 2009, entitled "System and Method for Managing Data and Policies," Inventor(s) Ratinder Paul Singh Ahuja et al. (76 pages).

U.S. Appl. No. 12/690,153, filed Jan. 20, 2010, entitled "Query Generation for a Capture System," Inventor(s) Erik de la Iglesia, et al.

U.S. Appl. No. 12/751,876, filed Mar. 31, 2010, entitled "Attributes of Captured Objects in a Capture System," Inventor(s) William Deninger, et al.

U.S. Appl. No. 12/829,220, filed Jul. 1, 2010, entitled "Verifying Captured Objects Before Presentation," Inventor(s) Rick Lowe, et al.

U.S. Appl. No. 12/873,061, filed Aug. 31, 2010, entitled "Document Registration," Inventor(s) Ratinder Paul Singh Ahuja, et al.

U.S. Appl. No. 12/873,860, filed Sep. 1, 2010, entitled "A System and Method for Word Indexing in a Capture System and Querying Thereof," Inventor(s) William Deninger, et al.

U.S. Appl. No. 12/939,340, filed Nov. 3, 2010, entitled "System and Method for Protecting Specified Data Combinations," Inventor(s) Ratinder Paul Singh Ahuja, et al.

U.S. Appl. No. 12/967,013, filed Dec. 13, 2010, entitled "Tag Data Structure for Maintaining Relational Data Over Captured Objects," Inventor(s) Erik de la Iglesia, et al. (42 pages).

Han, OLAP Mining: An Integration of OLAP with Data Mining, Oct. 1997, pp. 1-18.

Niemi, Constructing OLAP Cubes Based on Queries, Nov. 2001, pp. 1-7.

Schultz, Data Mining for Detection of New Malicious Executables, May 2001, pp. 1-13.

U.S. Appl. No. 13/024,923, filed Feb. 10, 2011, entitled "High Speed Packet Capture," Inventor(s) Weimin Liu, et al. (50 pages).

U.S. Appl. No. 13/047,068, filed Mar. 14, 2011, entitled "Cryptographic Policy Enforcement," Inventor(s) Ratinder Paul Singh Ahuja, et al. (45 pages).

U.S. Appl. No. 13/049,533, filed Mar. 16, 2011, entitled "File System for a Capture System," Inventor(s) Rick Lowe, et al. (49 pages).

U.S. Appl. No. 13/089,158, filed Apr. 18, 2011, entitled "Attributes of Captured Objects in a Capture System," Inventor(s) Ratinder Paul Singh Ahuja, et al. (81 pages).

U.S. Appl. No. 13/099,516, filed May 3, 2011, entitled "Object Classification in a Capture System," Inventor(s) William Deninger, et al. (48 pages).

Mao et al. "MOT: Memory Online Tracing of Web Information System," Proceedings of the Second International Conference on Web Information Systems Engineering (WISE '01); pp. 271-277, (IEEE0-0-7695-1393-X/02) Aug. 7, 2002 (7 pages).

(56) References Cited

OTHER PUBLICATIONS

International Search Report and Written Opinion and Declaration of Non-Establishment of International Search Report for International Application No. PCT/US2011/024902 mailed Aug. 1, 2011 (8 pages).
U.S. Appl. No. 13/168,739, filed Jun. 24, 2011, entitled "Method and Apparatus for Data Capture and Analysis System," Inventor(s) Erik de la Iglesia, et al. (24 pages).
U.S. Appl. No. 13/187,421, filed Jul. 20, 2011, entitled "Query Generation for a Capture System," Inventor(s) Erik de la Iglesia, et al. (75 pages).
U.S. Appl. No. 13/188,441, filed Jul. 21, 2011, entitled "Locational Tagging in a Capture System," Inventor(s) William Deninger et al.
Webopedia, definition of "filter", 2002, p. 1.
Werth, T. et al., "Chapter 1—DAG Mining in Procedural Abstraction," Programming Systems Group; Computer Science Department, University of Erlangen-Nuremberg, Germany.
Chapter 1. Introduction, "Computer Program product for analyzing network traffic," Ethereal. Computer program product for analyzing network traffic, pp. 17-26, http://web.archive.org/web/20030315045117/www.ethereal.com/distribution/docs/user-guide, approximated copyright 2004-2005, printed Mar. 12, 2009.
U.S. Appl. No. 13/422,791, filed Mar. 16, 2012, entitled "System and Method for Data Mining and Security Policy Management", Inventor, Weimin Liu (102 pages).
U.S. Appl. No. 13/424,249, filed Mar. 19, 2012, entitled "System and Method for Data Mining and Security Policy Management", Inventor, Weimin Liu (102 pages).
U.S. Appl. No. 13/431,678, filed Mar. 27, 2012, entitled "Attributes of Captured Objects in a Capture System", Inventors William Deninger, et al. (61 pages).
U.S. Appl. No. 13/436,275, filed Mar. 30, 2012, entitled "System and Method for Intelligent State Management", Inventors William Deninger, et al. (88 pages).
U.S. Appl. No. 13/337,737, filed Dec. 27, 2011, entitled "System and Method for Providing Data Protection Workflows in a Network Environment", Inventor(s) Ratinder Paul Singh Ahuja, et al. (141 pages).
U.S. Appl. No. 13/338,060, filed Dec. 27, 2011, entitled "System and Method for Providing Data Protection Workflows in a Network Environment", Inventor(s) Ratinder Paul Singh Ahuja, et al. (144 pages).
U.S. Appl. No. 13/338,159, filed Dec. 27, 2011, entitled "System and Method for Providing Data Protection Workflows in a Network Environment", Inventor(s) Ratinder Paul Singh Ahuja, et al. (144 pages).
U.S. Appl. No. 13/338,195, filed Dec. 27, 2011, entitled "System and Method for Providing Data Protection Workflows in a Network Environment", Inventor(s) Ratinder Paul Singh Ahuja, et al. (144 pages).
U.S. Appl. No. 14/157,130, filed Jan. 16, 2014, entitled "System and Method for Providing Data Protection Workflows in a Network Environment", Inventor(s) Ratinder Paul Singh Ahuja, et al. (154 pages).
U.S. Appl. No. 14/042,202, filed Sep. 30, 2013, entitled "Document De-Registration", Inventors(s) Ratinder Paul Singh Ahuja, et al., 60 pages.
Walter Allasia et al., Indexing and Retrieval of Multimedia Metadata on a Secure DHT, University of Torino, Italy, Department of Computer Science, Aug. 31, 2008, 16 pages.
International Preliminary Report on Patentability Written Opinion of the International Searching Authority for International Application No. PCT/US2011/024902 dated May 7, 2013 (5 pages).
U.S. Appl. No. 13/896,210, filed May 16, 2013, entitled "System and Method for Data Mining and Security Policy Management" Inventor(s) Ratinder Paul Singh Ahuja et al., (82 pages).
U.S. Appl. No. 14/181,521, filed Feb. 14, 2014 (22 pages).
U.S. Appl. No. 14/222,477, filed Mar. 21, 2014 (86 pages).
English Translation of the Notice of Preliminary Rejection, KIPO Office Action Mailing Date Apr. 22, 2014 Office Action Summary, 2 pages.
Peter Gordon, "Data Leakage—Threats and Mitigation", In: SANS Inst. (2007). http://www.sans.org/reading-room/whitepapers/awareness/data-leakage-mitigation-1931?show=data-leakage-threats-mitigation-1931&cat=awareness (69 pages).
English Translation of the Notice of Preliminary Rejection, KIPO Office Action Mailing Date Oct. 8, 2014 Office Action Summary, 3 pages.
Non-Provisional U.S. Appl. No. 14/457,038, filed Aug. 11, 2014 73 pages.
English Translation of the Notice of Allowance, KIPO mailing date Apr. 15, 2015, Notice of Allowance Summary, 1 page.
Compression of Boolean inverted files by document ordering Gelbukh, A.; Sangyong Han; Sidorov, G. Natural Language Processing and Knowledge Engineering, 2003. Proceedings. 2003 International Conference on Year: 2003 pp. 244-249, DOI: 10.1109/NLPKE.2003.1275907.
A Model-Driven Approach for Documenting Business and Requirements Interdependencies for Architectural Decision Making Berrocal, J.; Garcia Alonso, J.; Vicente Chicote, C.; Murillo, J.M. Latin America Transactions, IEEE (Revista IEEE America Latina) Year: 2014, vol. 12, Issue: 2 pp. 227-235, DOI: 10.1109/TLA.2014.6749542.
Further Result on Distribution Properties of Compressing Sequences Derived From Primitive Sequences Over Oun-Xiong Zheng; Wen-Feng Qi; Tian Tian Information Theory, IEEE Transactions on Year: 2013, vol. 59, Issue: 8 pp. 5016-5022, DOI: 10.1109/TIT.2013.2258712.
Compressing Inverted Files in Scalable Information Systems by Binary Decision Diagram Encoding Chung-Hung Lai; Tien-Fu Chen Supercomputing, ACM/IEEE 2001 Conference Year: 2001 pp. 36-36, DOI: 10.1109/SC.2001.10019.
Office Action issued by the Chinese Patent Office on Mar. 10, 2016 in Chinese Patent Application No. 201180058414.4.

* cited by examiner

Predefined Concepts

::: Reconnex | CONTROL  Welcome admin | Logout | My Profile | Help

| HOME | INCIDENTS | CASE | CAPTURE | POLICIES | SYSTEM |

Policies  Templates  Action Rules  [+] Concepts  Registered Documents

User Defined | Factory Default

Actions ⬆

| ☐ | Concept Name | Description | Last Modified | How To Delete |
|---|---|---|---|---|
| ☐ | ADMISSION-DISCHARGE | Patient admission and discharge related information | Thu Aug 7 16:28:44 PDT 2008 | 🗑 |
| ☐ | BANK-ABA | Bank routing or transit number information | Thu Aug 7 16:28:44 PDT 2008 | 🗑 |
| ☐ | BANK-ACNT | Terms relating to bank account information | Thu Aug 7 16:28:44 PDT 2008 | 🗑 |
| ☐ | BANK-STMT | Terms often found in bank statements | Thu Aug 7 16:28:44 PDT 2008 | 🗑 |
| ☐ | BLOGPOST | Websites that are commonly used for blog posting activities | Thu Aug 7 16:28:44 PDT 2008 | 🗑 |
| ☐ | BOARD-MEETING | Terms commonly found in documents detailing board meeting activities | Thu Aug 7 16:28:44 PDT 2008 | 🗑 |
| ☐ | CLASSIFIED-DRUGS-CODES | Classified drug codes | Thu Aug 7 16:28:44 PDT 2008 | 🗑 |
| ☐ | COMMON-DISEASE | Terms associated with common diseases | Thu Aug 7 16:28:44 PDT 2008 | 🗑 |
| ☐ | COMP-BENEFITS | Terms pertaining to compensation and benefits | Thu Aug 7 16:28:44 PDT 2008 | 🗑 |
| ☐ | COMPLIANCE-REPORT | Terms commonly found in compliance reports | Thu Aug 7 16:28:44 PDT 2008 | 🗑 |
| ☐ | CONFIDENTIAL | Commonly-used terms for expressing confidentiality | Thu Aug 7 16:28:44 PDT 2008 | 🗑 |
| ☐ | CORPCONFIDENTIAL | Corporate confidential attribute | Thu Aug 7 16:28:44 PDT 2008 | 🗑 |

MULTIPLE KEYWORDS, USER WILL NEED TO CHOOSE ROOT TERM

First Step

::: Reconnex

Basic Search

Input Type: [Keywords ▼]  [confidential coyote |]

Date/Time: [Anytime ▼]  [Search]  [Save Search]

STATUS: Search Complete | [details]

[Incident listing ▼]  [Save 💾]  [Columns ⚙]

[List]  [Group Detail]  [Summary]

[Actions ➡]  Results From [Monitor Devices ▼]  Select

Actions menu:
- Select All on Page
- Select All Results
- Deselect All on Page
- Deselect All Results
- Assign to Case ►

| | | nt | Sender | Recipients |
|---|---|---|---|---|
| | | TP | Gustavo Barba (gbarba@xyz.abc) | Linda Connell (Linda.J.Connell@abc.abc) |
| | | ML | Gustavo Barba (gbarba@xyz.abc) | Linda Connell (Linda.J.Connell@abc.abc) |
| | | rd | Richard Mains (rmains@cba.abc) | Kathy Johnson (kathy.a.johnson@abc.abc) |
| ☐ | 🔍 | ✉ SMTP | John Williamson (jwilliamson@def.abc) | 'Craig Buxton' (cpbuxton@def.abc) |
| ☐ | 🔍 | 📄 HTML | Gustavo Barba (gbarba@xyz.abc) | Linda Connell (Linda.J.Connell@abc.abc) |
| ☐ | 🔍 | ✉ SMTP | Susan_Mullan@SSSS.123.ca | backmed@xyz.123.abc |

ADD ACTION 'BUILD CONCEPT' POP-UP WITH FAILURE NOTICE IF NO SEARCH RESULTS SELECTED

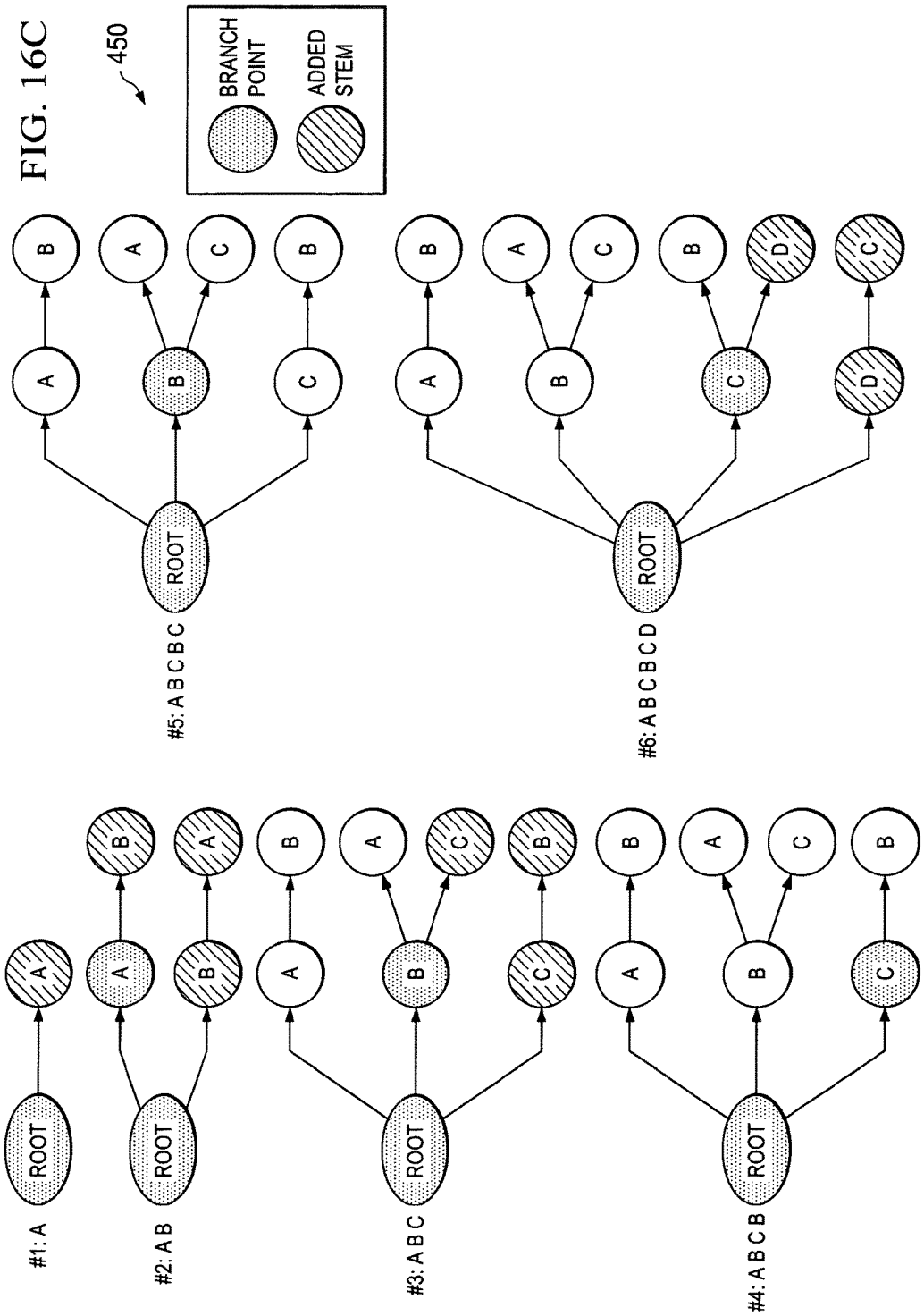

SYSTEM AND METHOD FOR INTELLIGENT STATE MANAGEMENT

CROSS-REFERENCE TO RELATED APPLICATIONS

This application is a continuation (and claims the benefit under 35 U.S.C. §120) of U.S. Ser. No. 13/436,275 filed Mar. 30, 2012, entitled "SYSTEM AND METHOD FOR INTELLIGENT STATE MANAGEMENT", and naming William Deninger et al. as inventors, which application is a divisional (and claims the benefit under 35 U.S.C. §120 and §121) of U.S. application Ser. No. 12/358,399, filed Feb. 25, 2009, entitled "SYSTEM AND METHOD FOR INTELLIGENT STATE MANAGEMENT", issued as U.S. Pat. No. 8,473,442 on Jun. 25, 2013. The disclosures of the prior applications are considered part of and are hereby incorporated by reference in their entireties in the disclosure of this application.

TECHNICAL FIELD OF THE INVENTION

This invention relates in general to the field of data management and, more particularly, to a system and a method for intelligent state management.

BACKGROUND OF THE INVENTION

Computer networks have become indispensable tools for modern business. Enterprises can use networks for communications and, further, can store data in various forms and at various locations. Critical information frequently propagates over a network of a business enterprise. Modern enterprises employ numerous tools to control the dissemination of such information and many of these tools attempt to keep outsiders, intruders, and unauthorized personnel from accessing valuable or sensitive information. Commonly, these tools can include firewalls, intrusion detection systems, and packet sniffer devices.

The ability to offer a system or a protocol that offers an effective data management system, capable of securing and controlling the movement of important information, provides a significant challenge to security professionals, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 6A-6C are simplified screenshots of example features of one embodiment of the present invention;

FIGS. 8A-9C are simplified screenshots of example features of one embodiment of the present invention;

FIGS. 16A-16D are simplified configurations associated with intelligent grouping terms;

DETAILED DESCRIPTION OF EXAMPLE EMBODIMENTS

Figure 1:
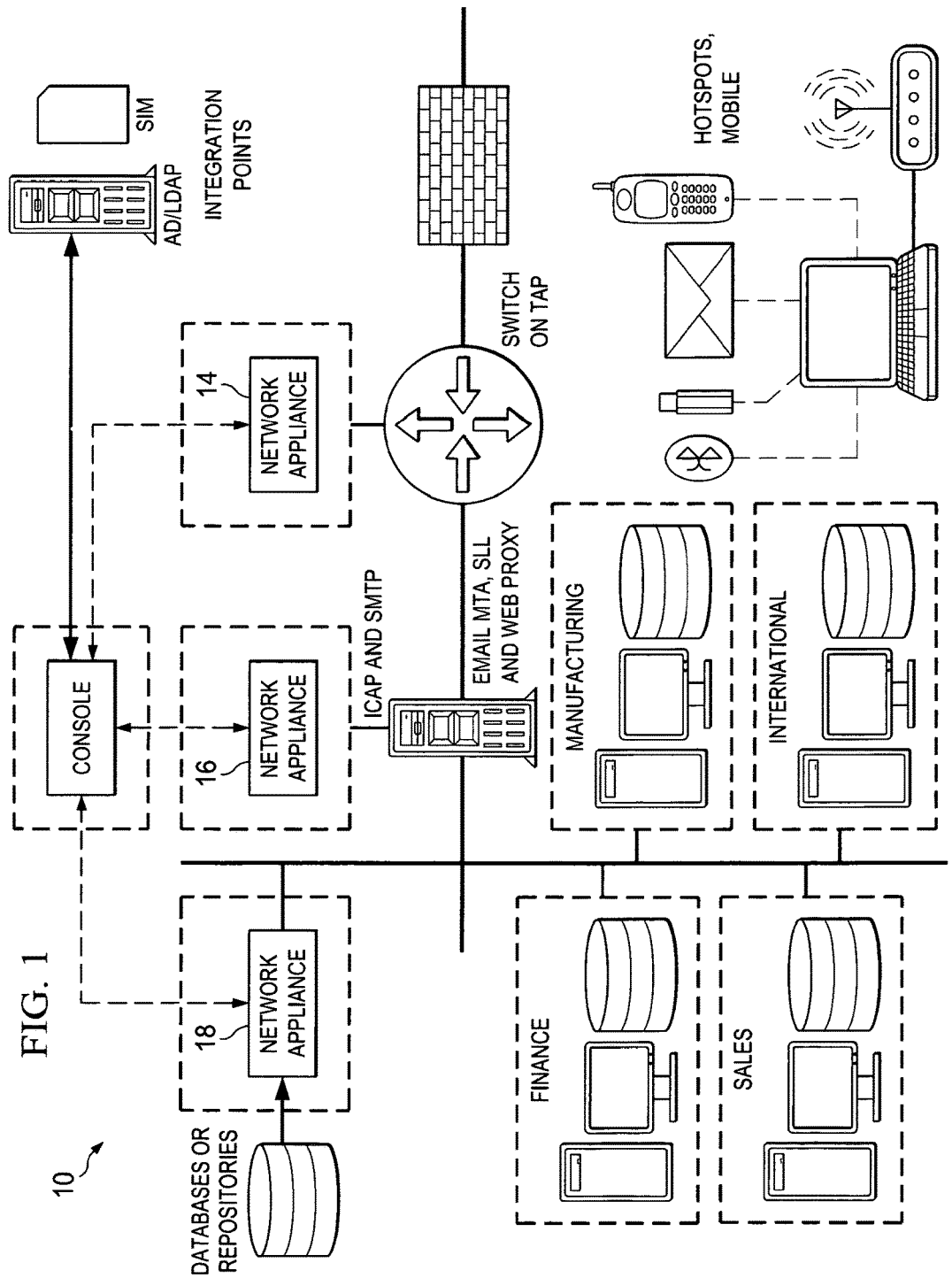
FIG. 1 is a simplified block diagram of a communication system for controlling information in a network environment in accordance with one embodiment of the present invention.

FIG. 1 is a simplified block diagram of a communication system 10 for controlling information in a network environment. Communication system 10 may include multiple network elements such as network appliances 14, 16, and 18, which can be managed or otherwise coupled to a console element.

FIG. 1 may be generally configured or arranged to represent any communication architecture capable of exchanging packets in a network environment. Such configurations may include separate divisions of a given business entity such as that which is shown for purposes of illustration in FIG. 1 (e.g., Manufacturing segment, International segment, Finance segment, Sales segment, etc.). Each network appliance may be coupled to one or more databases and, further, be able to access communication pathways associated with this particular configuration. For example, one or more of the network appliances may have access to e-mail traffic, or data that is simply residing somewhere in the business infrastructure (e.g., on a server, a repository, etc.).

Communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

For purposes of illustrating the techniques of communication system 10, it is important to understand the somewhat esoteric security concerns that may be present in the architecture of FIG. 1. The following foundational information may be viewed as a basis from which the present invention may be properly explained. Such information is offered earnestly for purposes of explanation only and, accordingly, should not be construed in any way to limit the broad scope of the present invention and its potential applications.

The challenge in many security environments is that document registration is not scalable. Furthermore, synthesizing sensitive information can be complicated and time intensive (often involving manual operations on the part of a security professional). In addition, the general proposition of 'concept creation' can be intimidating. In example embodiments of the present invention, the proposed architecture offers an ideal concept builder to synthesize document commonalities into a concept. In a general sense, the concept builder architecture can select key terms and regular expressions from text mining and then synthesize these into a concept, which can then be added to a rule, for which compliance can be achieved for groups of documents. Stated in other terms, example embodiments of the present invention can perform optimal object classification in the context of data mining.

The concept builder system can be initiated against search results or via an incident list view. Furthermore, the architecture detailed herein can provide a user-selectable grouping of "important" terms from a collection of meaningful terms. Moreover, such a system can transfer important terms and root terms to a concept screen for further manipulation. Note that the system can also readily transfer proximity information to the concept screen. Any of this information can be saved and, ultimately, later applied to rules. In regards to text mining, the proposed architecture can use some predefined starting point (e.g., the root term), determine the relevant terms, and then factor the distances [e.g., minimum/maximum/average frequencies from the root] and form some type of weighted order.

In operation of an example implementation, a number of key components may be included in the system. Concept maps (also referred to as attributes) may be leveraged in order to accomplish some of the teachings of the present invention. In one example, the architecture detects the presence of a set of terms (words, phrases, expressions) that can appear with a certain frequency, within a prescribed vicinity, having a certain direction, and/or with a certain threshold. The terms can be assigned a weight based on an end user's preferences.

Consider an example involving the concept of a "Google phone." A number of related terms (such as Android, SDK, Ogg, Vorbis, MIDI, ARM) may be used (or associated) with this term. These terms may be used to define [or be used in conjunction with] the Google phone. The security professional's dilemma is to define a given term (and to inherently know about related terms) and to extract that into a concept. Furthermore, the second aspect of this issue involves capturing this significant data. In current conventional systems, a security professional would be required to manually request and receive a number of terms that are associated with the given platform, such as the Google phone case identified above. For example, a security professional may have to query each technology group for terms being used to code, or to refer to, various aspects of the Google phone. That terminology and those words and phrases would then be configured in some sort of algorithm that would attempt to provide meaningful filtering for an associated architecture. In essence, example embodiments of the present invention are automating this process in providing a superior solution to this problem.

Before turning to some of the operational aspects of this architecture, a brief discussion is provided about some of the infrastructure of FIG. 1. Some sensitive content, such as Social Security numbers, are easily identified and protected using simple classification techniques. However, much corporate data is not in a fixed format. Identifying and protecting this "free form" content, in all its permutations, takes a set of sophisticated classification techniques operating in concert. To be effective, an information protection system must employ multiple data classification techniques.

Using network appliances 14, 16, and 18, communication system 10 can offer a protection system that enables an organization to protect all information assets on its network without requiring upfront knowledge of what needs to be protected, and regardless of how that information is stored, secured, or communicated. As a result, a security professional can protect against both known and emerging threats. Network appliances 14, 16, and 18 can act as a point of policy control and enforcement based on a set of configured policies and rules. When a network appliance identifies a risk event, it alerts an administrator, which can leverage existing infrastructure to block sensitive information from leaving the network. The network appliances can be deployed easily at network egress points (for example, behind a firewall, as highlighted below in FIG. 2) to protect external-to-internal and internal-to-external traffic. In alternative embodiments, the network appliances can be deployed within an enterprise network (for example, in the data center) to protect internal-to-internal communications. As a device deployed using passive interception techniques, such as a network tap or in traffic mirroring, the network appliance operates non-disruptively: requiring no changes to applications, servers, workstations, or the network itself. The network appliance is able to monitor and analyze all applications, protocols, and content types and trigger enforcement actions in real time due to its memory based architecture.

The console illustrated in FIG. 1 is designed to simplify administration, as it can offer a centralized interface to manage all security policies across multiple network appliances. The console supports role-based, delegated access, which allows a security professional to designate who can create and modify policies, as well as who can access the corresponding findings. From within the console, a security professional can centrally define policies and the actions to be taken when a policy is triggered. Policies can range from simple protections, such as identifying and controlling access to Social Security numbers, to sophisticated protections, such as building a custom intellectual property filter. Enforcement actions can include alerting the appropriate administrator; directing an enforcement device to block or quarantine the suspect traffic and/or reporting on the traffic. The console also provides a centralized query mechanism, which allows organizations to quickly search through the capture databases contained on multiple distributed network appliances simultaneously. By allowing the administrator a unified view over all historical data captured throughout points in the network where network appliances are deployed, organizations can quickly perform forensic analysis, conduct investigations, and leverage captured data to update security posture to handle new sensitive information or emerging threats. In addition, the console provides unified reports and diagnostic information.

Figure 2:
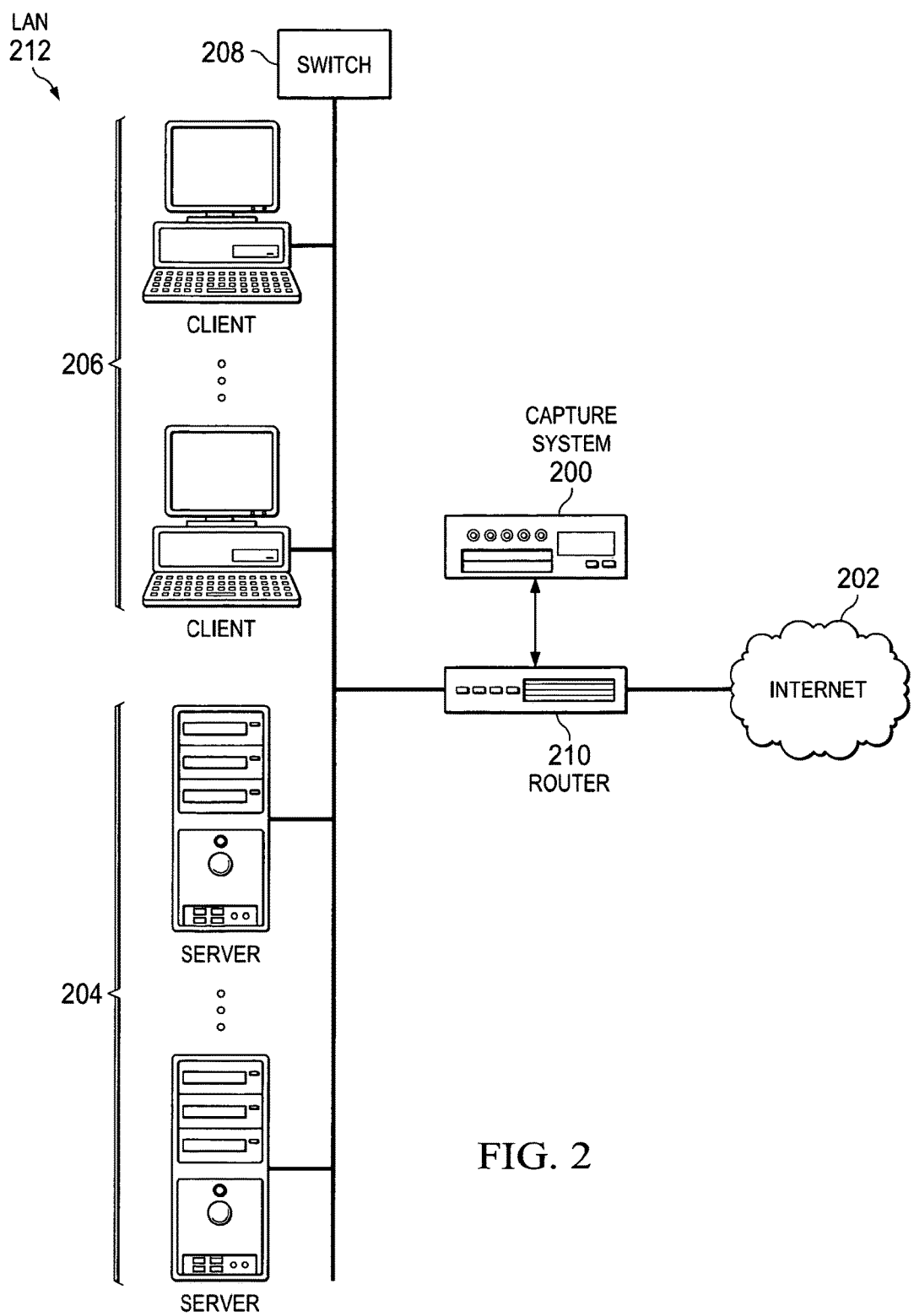
FIGS. 2-5 are simplified block diagrams of various aspects of the communication system in accordance with example embodiments of the present invention.

Turning to FIG. 2, FIG. 2 is a simplified block diagram illustrating an example implementation of the present invention. Included in FIG. 2 is a local area network (LAN) 212 connected to an Internet 202 component. Connected to LAN 212 are various components, such as servers 204, clients 206, and a switch 208. Numerous other networking components and computing devices may be connected to LAN 212, as FIG. 2 is simply representing one of the many potential implementations of the present invention. LAN 212 may be implemented using various wireline (e.g., Ethernet) or wireless technologies (e.g., IEEE 802.11x). LAN 212 could also be connected to other LANs or replaced with any other type of suitable network where appropriate and according to particular needs. Such networks include a wireless LAN (WLAN), a metropolitan area network (MAN), a wide area network (WAN), a virtual private network (VPN), or any other appropriate architecture or system that facilitates communications in a network environment.

In this example configuration, LAN 212 is connected to Internet 202 via a router 210. Router 210 may be used to implement a firewall. Data leaving LAN 212 and going to Internet 202 can pass through router 210. Router 210 can simply forward packets from LAN 212 to Internet 202. FIG. 2 also illustrates an embodiment of a system utilizing a capture system 200. Capture system 200 may be part of (or coupled to) network appliances 14, 16, and 18 of FIG. 1.

In FIG. 2, router 210 is connected to capture system 200 in addition to Internet 202 and LAN 212. Generally, router 210 transmits the outgoing data stream to Internet 202 and a copy of that stream to capture system 200. Router 210 may also send incoming data to capture system 200 and LAN 212.

In alternative embodiments, instead of being implemented in conjunction with (or included within) a router (which could be network appliances 14, 16, and 18), capture system 200 may be included as part of other network appliances such as switches, gateways, bridges, loadbalancers, servers, or any other suitable device, component, element, or object operable to exchange information in a network environment. Moreover, these network appliances and/or capture systems may include any suitable hardware, software, components, modules, interfaces, or objects that facilitate the operations thereof. This may be inclusive of appropriate algorithms and communication protocols that facilitate the concept building operations detailed herein.

One or more tables may be included in these network appliances (or within capture system 200). In other embodiments, these tables may be provided externally to these elements, or consolidated in any suitable fashion. The tables are memory elements for storing information to be referenced by their corresponding network appliances. As used herein in this document, the term 'table' is inclusive of any suitable database or storage medium (provided in any appropriate format) that is capable of maintaining information pertinent to the operations detailed herein in this Specification. For example, the tables may store information in an electronic register, diagram, record, index, list, or queue. Alternatively, the tables may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Capture system 200 may be configured sequentially in front of, or behind, router 210. In systems where a router is not used, capture system 200 may be located between LAN 212 and Internet 202. Stated in other terms, if a router is not used, capture system 200 can operate to forward packets to Internet 202, in accordance with one example paradigm. In one embodiment, capture system 200 has a user interface accessible from a LAN-attached device such as a client(s) 206.

Clients 206 are endpoints or customers wishing to affect or otherwise manage a communication in communication system 10. The term 'client' may be inclusive of devices used to initiate a communication, such as a computer, a personal digital assistant (PDA), a laptop or electronic notebook, a cellular telephone, or any other device, component, element, or object capable of initiating voice, audio, or data exchanges within communication system 10. The endpoints may also be inclusive of a suitable interface to the human user, such as a microphone, a display, or a keyboard or other terminal equipment. The endpoints may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

In operation, capture system 200 intercepts data leaving a network [such as LAN 212]. In an embodiment, the capture system also intercepts data being communicated internally to a network such as LAN 212. Capture system 200 can reconstruct documents leaving the network and store them in a searchable fashion. Capture system 200 is then used to search and sort through all documents that have left the network. There are many reasons why such documents may be of interest, including: network security reasons, intellectual property concerns, corporate governance regulations, and other corporate policy concerns. Example documents include, but are not limited to, Microsoft Office documents (such as Word, Excel, etc.), text files, images (such as JPEG, BMP, GIF, PNG, etc.), Portable Document Format (PDF) files, archive files (such as GZIP, ZIP, TAR, JAR, WAR, RAR, etc.), email messages, email attachments, audio files, video files, source code files, executable files, etc.

Figure 3:
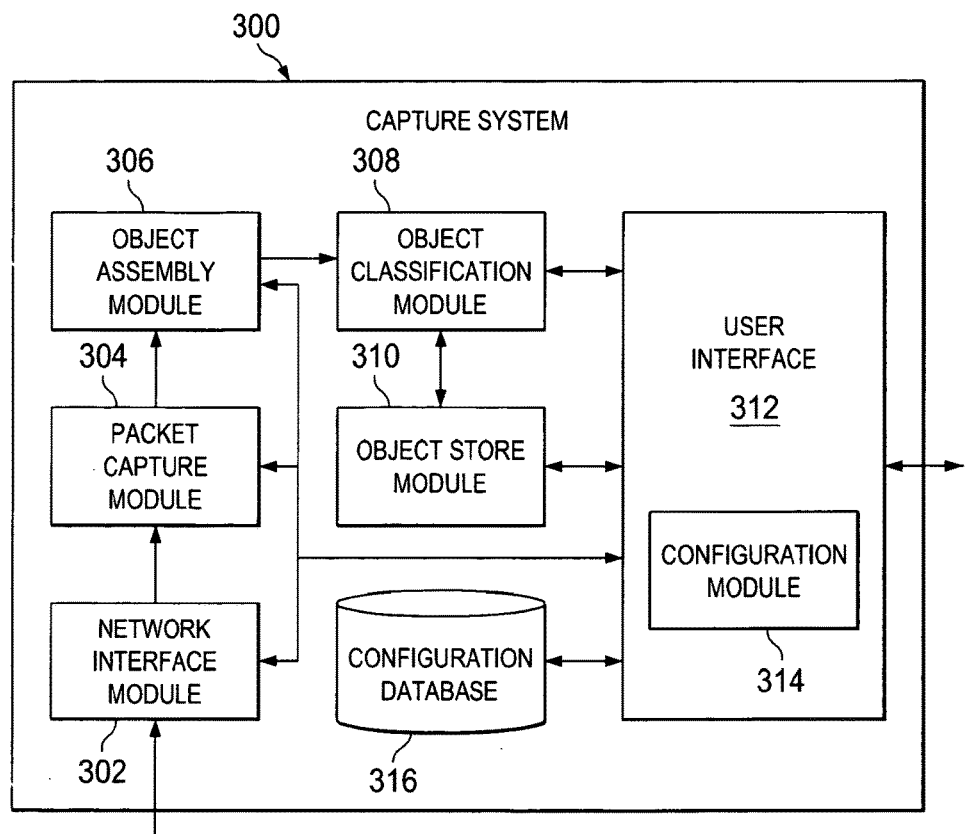

Turning to additional details of an example capture system, FIG. 3 illustrates another embodiment of a capture system 300. A capture system (such as capture system 200 or 300) may also be referred to as a content analyzer, content/data analysis system, or other similar reference name. Note that the discussion regarding capture system 300 is equally applicable to capture system 200. A network interface module 302 can receive (captures) data, such as data packets, from a network or a router. Network interface module 302 can include network interface cards (NICs) (for example, Ethernet cards: wired or wireless connections). More than one NIC may be present in a capture system.

This captured data can be passed from network interface module 302 to a packet capture module 304, which extracts packets from the captured data. Packet capture module 304 may extract packets from streams with different sources and/or destinations. One such case is asymmetric routing, where a packet sent from source "A" to destination "B" travels along a first path and responses sent from destination "B" to source "A" travel along a different path. Accordingly, each path could be a separate "source" for packet capture module 304 to obtain packets. Additionally, packet data may be extracted from a packet by removing the packet's header and checksum.

When an object is transmitted, such as an email attachment, it can be broken down into packets according to various data transfer protocols such as Transmission Control Protocol/Internet Protocol ("TCP/IP"), UDP, HTTP, etc. An object assembly module 306 reconstructs the original [or a reasonably equivalent document] from the captured packets. For example, a PDF document broken down into packets before being transmitted from a network is reassembled to form the original [or reasonable equivalent of] the PDF from the captured packets associated with the PDF document. A complete data stream can be obtained by reconstruction of multiple packets.

In one embodiment, capture rules are authored by the user(s) of a capture system. Capture system 300 is accessible for any network-connected machine through network interface module 302 and/or user interface 312. In one embodiment, user interface 312 is a graphical user interface providing the user with easy access to the various features of capture system 300 via a configuration module 314. For example, configuration module 314 may provide a capture rule-authoring tool. Configuration module 314 can create rules based on the content of the object intercepted (e.g., particular words, flesh tones in images, etc.), the source or destination of the packets or object (e.g., email address, IP address, etc.), file information (e.g., file size, encryption, etc.), protocol or port information, date or time, or custom parameters (e.g., number of occurrences of particular content, location of particular content within a document, a percentage match, defined patterns such as social security numbers or credit card numbers, etc).

In one embodiment, configuration module 314 enables a user to create a basic rule template, which contains as much or as little detail as desired, where the template can be subsequently saved in the configuration database. Multiple detailed rules can then be created based on the template. Exceptions to the rules may also be provided or created based on any of the parameters discussed above: for example, special permissions for a CEO as described above.

Actions to be taken by capture system 300 when a rule is violated are also provided or defined in configuration module 314. A rule violation can trigger one or more of the following actions: an email notification, Syslog notification, the generation of a status message regarding (e.g., new, reviewed, false positive, etc.) the violation for follow-up, and the prevention of transmission of the object that triggered the rule violation. In one embodiment, violation notifications are created using stock language combined with dynamic variables to uniquely identify the violation. For example, the message could include dynamic variables such as "rulename, source.ip, source.user, and source.location" to provide details as to which rule was violated and the source of object that triggered the violation.

In one embodiment, configuration module 314 provides preconfigured capture rules from which the user selects along with an explanation of the operation of such standard included capture rules. Generally, by default, the capture rule(s) implemented by object classification module 308 captures all objects leaving the network with which capture system 300 is deployed.

The rules, whether authored by a user or provided as a default, can be stored in a configuration database 316 and applied by object classification module 308 when determining whether or not to take action in regard to an object. In one embodiment, object classification module 308 accesses rules stored in configuration database 316 via user interface 312. In an alternate embodiment, object classification module 308 accesses rules stored in configuration database 316 directly. If the capture of an object is mandated by one or more capture rules, object classification module 308 may determine where in object store module 310 the captured object should be stored or quarantined.

Figure 4:
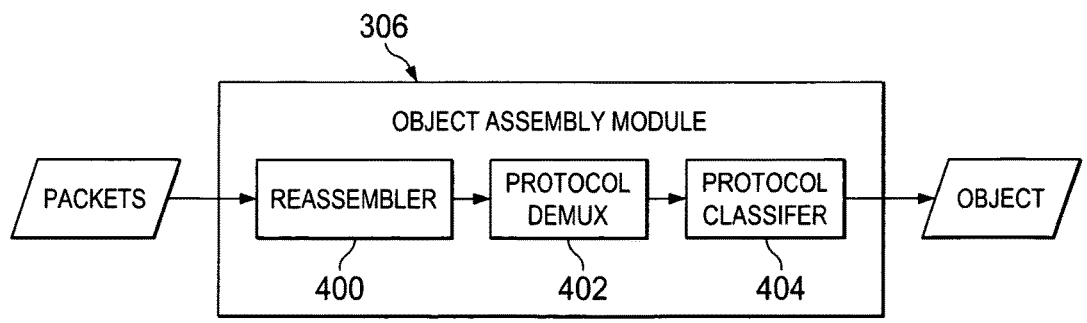

FIG. 4 illustrates a more detailed embodiment of object assembly module 306. This object assembly module includes a reassembler 400, a protocol demultiplexer ("demux") 402, and a protocol classifier 404. Packets entering the object assembly module 306 are provided to reassembler 400. Reassembler 400 groups (assembles) the packets into at least one unique flow. A TCP/IP flow contains an ordered sequence of packets that may be assembled into a contiguous data stream by reassembler 400. An example flow includes packets with an identical source IP and destination IP address and/or identical TCP source and destination ports. In other words, reassembler 400 assembles a packet stream (flow) by sender and recipient. Thus, a flow is an ordered data stream of a single communication between a source and a destination. In one example embodiment, a state machine is maintained for each TCP connection, which ensures that the capture system has a clear picture of content moving across every connection.

Reassembler 400 can begin a new flow upon the observation of a starting packet. This starting packet is normally defined by the data transfer protocol being used. For example, the starting packet of a TCP flow is a "SYN" packet. The flow terminates upon observing a finishing packet (e.g., a "Reset" or "FIN" packet in TCP/IP) or via a timeout mechanism if the finished packing is not observed within a predetermined time constraint.

A flow assembled by reassembler 400 can be provided to protocol demultiplexer ("demux") 402. Protocol demux 402 sorts assembled flows using ports, such as TCP and/or UDP ports, by performing speculative classification of the flow's contents based on the association of well-known port numbers with specified protocols. For example, because web Hyper Text Transfer Protocol (HTTP) packets, such as, Web traffic packets, are typically associated with TCP port 80, packets that are captured over TCP port 80 are speculatively classified as being HTTP. Examples of other well-known ports include TCP port 20 (File Transfer Protocol ("FTP")), TCP port 88 (Kerberos authentication packets), etc. Thus, protocol demux 402 can separate flows by protocols.

Protocol classifier 404 further sorts flows. Protocol classifier 404 (operating in either parallel or in sequence to protocol demux 402) applies signature filters to a flow to identify the protocol (e.g., based on the transported data). Protocol classifier 404 uses a protocol's signature(s) (i.e., the characteristic data sequences of a defined protocol) to verify the speculative classification performed by protocol demux 402. If protocol classifier 404 determines that the speculative classification is incorrect, it can override it. For example, if an individual or program attempted to masquerade an illicit communication (such as file sharing) using an apparently benign port (for example, TCP port 80), protocol classifier 404 would use the HTTP protocol signature(s) to verify the speculative classification performed by protocol demux 402.

Protocol classification helps identify suspicious activity over non-standard ports. A protocol state machine is used to determine which protocol is being used in a particular network activity. This determination is made independent of the port or channel on which the protocol is active. As a result, the capture system recognizes a wide range of protocols and applications, including SMTP, FTP, HTTP, P2P, and proprietary protocols in client-server applications. Because protocol classification is performed independent of which port number was used during transmission, the capture system monitors and controls traffic that may be operating over non-standard ports. Non-standard communications may indicate that an enterprise is at risk from spyware, adware, or other malicious code, or that some type of network abuse or insider threat may be occurring.

Object assembly module 306 outputs each flow, organized by protocol: representing the underlying objects being transmitted. These resultant objects can be passed to object classification module 308 (also referred to as the "content classifier") for classification based on content. A classified flow may still contain multiple content objects depending on the protocol used. For example, a single flow using HTTP may contain over one hundred objects of any number of content types. To deconstruct the flow, each object contained in the flow can be individually extracted and decoded, if necessary, by object classification module 308.

Object classification module 308 can use the inherent properties and/or signature(s) of various documents to determine the content type of each object. For example, a Word document has a signature that is distinct from a PowerPoint document or an email. Object classification module 308 can extract each object and can sort them according to content type. This classification prevents the transfer of a document whose file extension or other property has been altered. For example, a Word document may have its extension changed from .doc to .dock but the properties and/or signatures of that Word document remain the same and detectable by object classification module 308. In other words, object classification module 308 functions beyond simple extension filtering.

According to an embodiment, a capture system (as identified herein) can use one or more of six mechanisms for classification: 1) content signature; 2) grammar analysis; 3) statistical analysis; 4) file classification; 5) document biometrics; and 6) concept maps.

Content signatures can be used to look for predefined byte strings or text and number patterns (i.e., Social Security numbers, medical records, and bank accounts). When a signature is recognized, it becomes part of the classification vector for that content. While beneficial when used in combination with other metrics, signature matching alone may lead to a high number of false positives.

Grammar analysis can determine if an object's content is in a specific language and filters accordingly based on this information. Various types of content have their own grammar or syntax. For example, "C" source code uses "if/then" grammar. Legal documents, resumes, and earnings results also have a particular grammar. Grammar analysis also enables an organization to detect the presence of non-English language-based content on their network.

File classification identifies content types regardless of the extensions applied to the file or compression. The file classification mechanism looks for specific file markers instead of relying on normal telltale signs such as .xls or .PDF.

Document biometrics identifies sensitive data even if the data has been modified. Document biometrics recognizes content rich elements in files regardless of the order or combination in which they appear. For example, a sensitive Word document may be identified even if text elements inside the document or the file name itself have been changed. Excerpts of larger files, e.g., a single column exported from an Excel spreadsheet containing Social Security numbers, may also be identified.

Document biometrics takes "snapshots" of protected documents in order to build a signature set for protecting them. In an embodiment, document biometrics distinguishes between public and confidential information within the same document.

Statistical analysis assigns weights to the results of signature, grammar, and biometric analysis. That is, the capture system tracks how many times there was a signature, grammar, or biometric match in a particular document or file. This phase of analysis contributes to the system's overall accuracy.

Concept maps may be used to define and track complex or unique content, whether at rest, in motion, or captured. Concept maps are based on combinations of data classification mechanisms and can provide a way to protect content using compound policies.

Object classification module 308 may also determine whether each object should be stored or discarded. This determination is based on definable capture rules used by object classification module 308. For example, a capture rule may indicate that all Web traffic is to be discarded. Another capture rule may indicate that all PowerPoint documents should be stored except for ones originating from the CEO's IP address. Such capture rules are implemented as regular expressions or by other similar means.

Filters may be applied based on whether or not a flow is interesting to the capture system (and its operators). For example, emails are typically interesting to track because they are commonly used to send information (confidential or not) outside of a network. What may not be as interesting, and thus filtered out, is an incoming stream of music from a web-based service such as Yahoo! Music or Napster.

Figure 5:
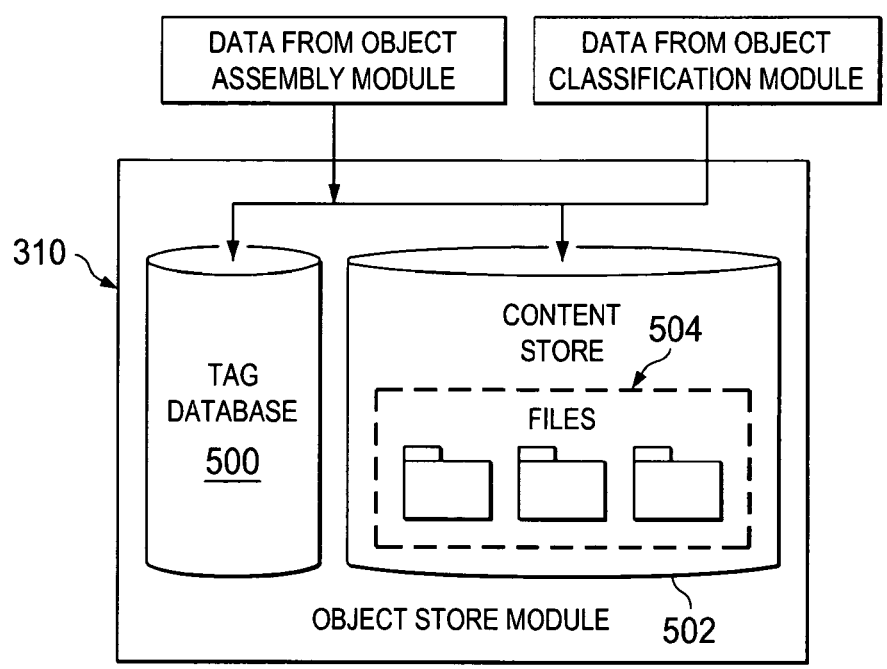

FIG. 5 illustrates an example embodiment of object store module 310. According to this embodiment, object store module 310 includes a tag database 500 and a content store 502. Within the content store 502 are files 504 grouped by content type. For example, if object classification module 308 determines that an object is a Word document that should be stored, it can store it in file 504 reserved for Word documents. Object store module 310 may be internal to a capture system or external (entirely or in part) using, for example, some network storage technique such as network attached storage (NAS), storage area network (SAN), or other database.

In regards to the tag data structure, in an embodiment, content store 502 is a canonical storage location that is simply a place to deposit the captured objects. The indexing of the objects stored in content store 502 is accomplished using tag database 500. Tag database 500 is a database data structure in which each record is a "tag" that indexes an object in content store 502 and contains relevant information about the stored object. An example of a tag record in tag database 500 that indexes an object stored in content store 502 is set forth in Table 1:

TABLE 1

| Field Name | Definition (Relevant Information) |
| --- | --- |
| MAC Address | NIC MAC address |
| Source IP | Source IP address of object |
| Destination IP | Destination IP address of object |
| Source Port | Source port number of object |
| Destination Port | Destination port number of the object |
| Protocol | Protocol that carried the object |
| Instance | Canonical count identifying object within a protocol capable of carrying multiple data within a single TCP/IP connection |
| Content | Content type of the object |
| Encoding | Encoding used by the protocol carrying object |
| Size | Size of object |
| Timestamp | Time that the object was captured |
| Owner | User requesting the capture of object (possibly rule author) |
| Configuration | Capture rule directing the capture of object |
| Signature | Hash signature of object |
| Tag Signature | Hash signature of all preceding tag fields |
| Attribute | One or more attributes related to the object |

There are various other possible tag fields and some tag fields listed in Table 1 may not be used. In an embodiment, tag database 500 is not implemented as a database and another data structure is used.

The mapping of tags to objects may be obtained by using unique combinations of tag fields to construct an object's name. For example, one such possible combination is an ordered list of the source IP, destination IP, source port, destination port, instance, and timestamp. Many other such combinations, including both shorter and longer names, are possible. A tag may contain a pointer to the storage location where the indexed object is stored.

The tag fields shown in Table 1 can be expressed more generally, to emphasize the underlying information indicated by the tag fields in various embodiments. Some of the possible generic tag fields are set forth in Table 2:

TABLE 2

| Field Name | Definition |
| --- | --- |
| Device Identity | Identifier of capture device |
| Source Address | Origination Address of object |
| Destination Address | Destination Address of object |
| Source Port | Origination Port of object |
| Destination Port | Destination Port of the object |
| Protocol | Protocol that carried the object |
| Instance | Canonical count identifying object within a protocol capable of carrying multiple data within a single connection |
| Content | Content type of the object |
| Encoding | Encoding used by the protocol carrying object |
| Size | Size of object |
| Timestamp | Time that the object was captured |
| Owner | User requesting the capture of object (rule author) |
| Configuration | Capture rule directing the capture of object |
| Signature | Signature of object |
| Tag Signature | Signature of all preceding tag fields |
| Attribute | One or more attributes related to the object |

For many of the above tag fields in Tables 1 and 2, the definition adequately describes the relational data contained by each field. Note that there are other fields that could be provided in both Table 1 and Table 2, as these lists are certainly not exhaustive. Those additional fields are clearly within the broad scope of the present invention.

Regarding the content field, the types of content for which the object can be labeled are numerous. Some example choices for content types (as determined, in one embodiment, by object classification module 308) are JPEG, GIF, BMP, TIFF, PNG (for objects containing images in these various formats); Skintone (for objects containing images exposing human skin); PDF, MSWord, Excel, PowerPoint, MSOffice (for objects in these popular application formats); HTML, Webmail, SMTP, FTP (for objects captured in these transmission formats); Telnet, Rlogin, Chat (for communication conducted using these methods); GZIP, ZIP, TAR (for archives or collections of other objects); Basic_Source, C++_Source, C_Source, Java_Source, FORTRAN_Source, Verilog_Source, VHDL_Source, Assembly_Source, Pascal_Source, Cobol_Source, Ada_Source, Lisp_Source, Perl_Source, XQuery_Source, Hypertext Markup Language, Cascaded Style Sheets, JavaScript, DXF, Spice, Gerber, Mathematica, Matlab, AllegroPCB, ViewLogic, TangoPCAD, BSDL, C_Shell, K_Shell, Bash_Shell, Bourne_Shell, FTP, Telnet, MSExchange, POP3, RFC822, CVS, CMS, SQL, RTSP, MIME, PDF, PS (for source, markup, query, descriptive, and design code authored in these high-level programming languages); C Shell, K Shell, Bash Shell (for shell program scripts); Plaintext (for otherwise unclassified textual objects); Crypto (for objects that have been encrypted or that contain cryptographic elements); Englishtext, Frenchtext, Germantext, Spanishtext, Japanesetext, Chinesetext, Koreantext, Russiantext (any human language text); Binary Unknown, ASCII Unknown, and Unknown (as catchall categories).

The signature contained in the Signature and Tag Signature fields can be any digest or hash over the object, or some portion thereof. In one embodiment, a well-known hash, such as MD5 or SHA1 can be used. In one embodiment, the signature is a digital cryptographic signature. In one embodiment, a digital cryptographic signature is a hash signature that is signed with the private key of capture system 300. Capture system 300 knows its own private key, thus, the integrity of the stored object can be verified by comparing a hash of the stored object to the signature decrypted with the public key of capture system 300, the private and public keys being a public key cryptosystem key pair. Thus, if a stored object is modified from when it was originally captured, the modification will cause the comparison to fail.

Similarly, the signature over the tag stored in the Tag Signature field can also be a digital cryptographic signature. In such an embodiment, the integrity of the tag can also be verified. In one embodiment, verification of the object using the signature, and the tag using the tag signature is performed whenever an object is presented, e.g., displayed to a user. In one embodiment, if the object or the tag is found to have been compromised, a message is generated to alert the user that the object displayed may not be identical to the object originally captured.

FIG. 6A is a simplified screenshot that illustrates a group of predefined concepts that may be used in the concept building protocol of the proffered architecture. A series of tabs have been provided in order to further guide and assist an end user in managing one or more policies associated with data mining, or in security generally. For purposes of illustration, the concept of "driver's license" is explored to highlight some of the teachings of the present invention. Also provided in FIG. 6A are two other concepts: the driver's license number (for docs) and a driver's license number (for message). Both of these concepts relate to commonly used expressions that support driver's license numbers. The system allows an end user or an administrator of the platform to configure a particular concept as being associated with a defined set of expressions and/or terms within a certain context. If the situation reveals that a certain concept is true, then the architecture can mark the condition of the presence of this particular concept.

Figure 6B:
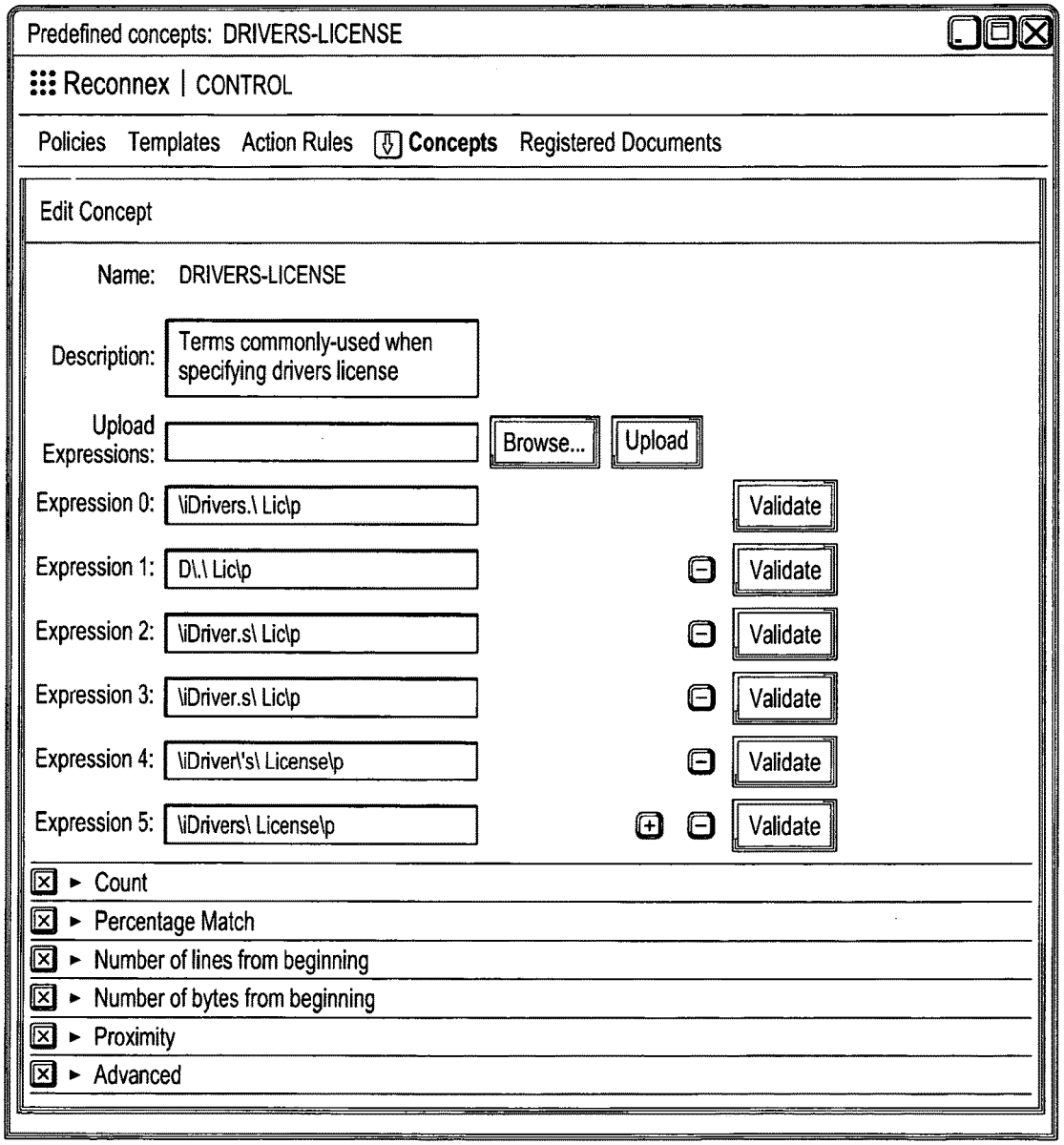

FIG. 6B is a simplified screenshot that illustrates the predefined concept of driver's license, which includes a description for terms commonly used when specifying a driver's license. Additionally, FIG. 6B illustrates a number of expressions associated with this individual concept. If any of the expressions appear, then the system can mark the presence of this concept of driver's license. In this sense, the expressions are a subset of the concept and their appearance connotes the presence of the concept.

Figure 6C:

Generally, the various expressions within the concept pertain to that class. There is an evaluation of intersections and unions between classes such that a Boolean construction can be used (or groups of words can be categorized) to define important concepts in the system. Concepts are powerful because they enable a customer to define their intellectual property for the system. Concepts can represent the fundamental building blocks by which a customer can define significant and/or sensitive information and, further, develop policies to control and properly manage that information. FIG. 6C simply illustrates a proximity parameter being used in conjunction with the concept. Note that while concept proximity is related to expression proximity to another concept, the architecture of the present invention can accommodate distances between expressions/terms within the same concept. In addition, proximity support between expressions/terms can be used to leverage the maximum distance from root term.

Figure 7:
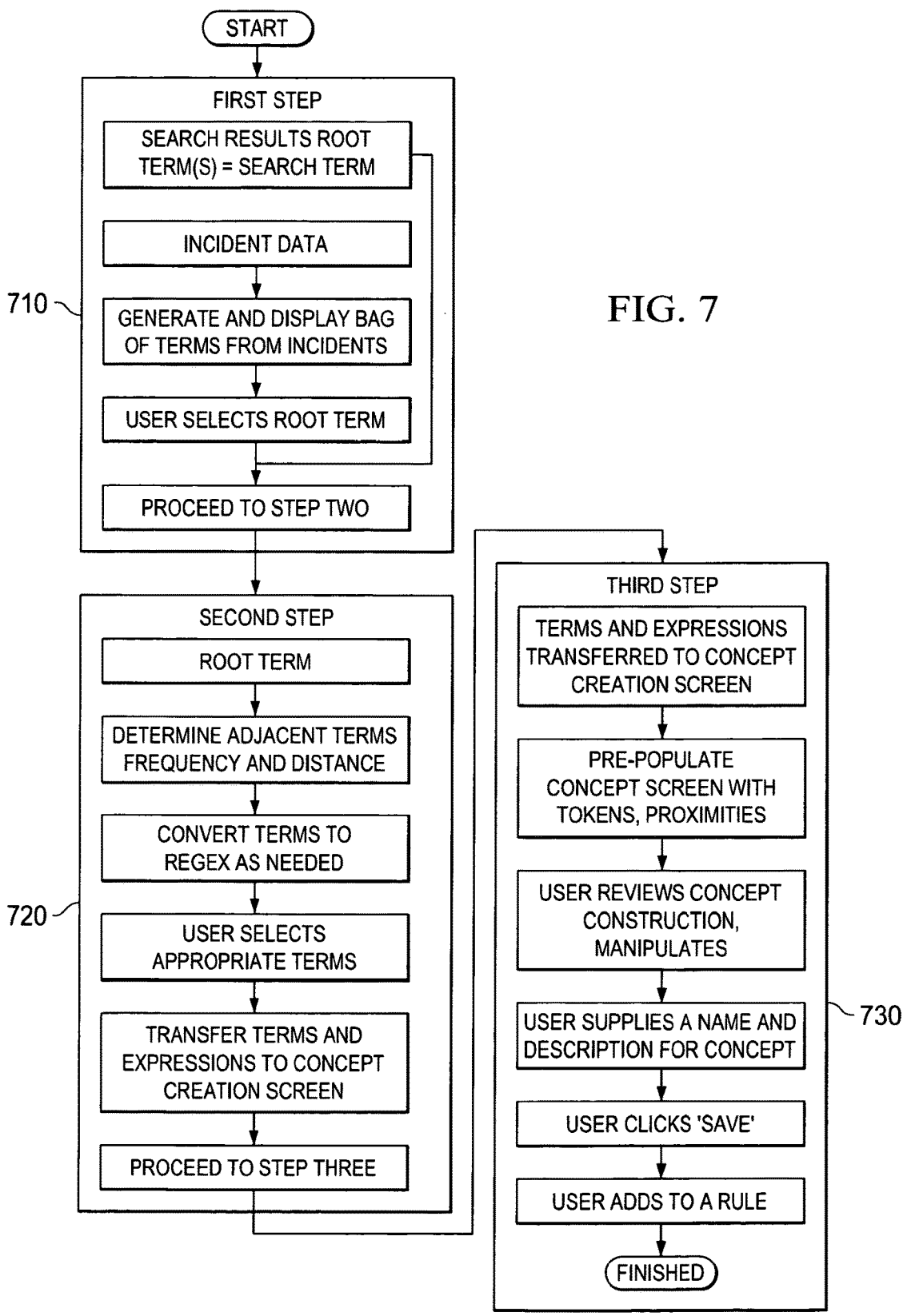
FIG. 7 is a simplified flowchart illustrating a series of example steps associated with the communication system.

Turning to FIG. 7, illustrated is a simplified flowchart that offers several basic steps in the concept building protocol in accordance with example implementations of the present invention. In a first basic step 710, an end user provides the starting point, where the results of a search, incident list, or incident details are included. If the starting point is not a search, a user provides the root term(s). In this example, root terms from a non-search starting point should be a collection of meaningful terms. The system can systematically create a collection (or bag) of terms from the root term.

In a second basic step 720 of the workflow, the system determines other terms, distance, and frequency. Additionally, the distance (minimum, maximum, average), and frequencies from the root term are identified. The end user can convert terms to regular expressions, as needed (re-summarize). Additionally, the user selects applicable items, where the selected items become the foundation for the concept. In a third basic step 730 of the workflow, terms and expressions are transferred to the concept creation screen. In addition, a prebuilt configuration can be accessed to allow the user to convert tokens to regular expressions and back again. In this particular flow, a user can supply names/descriptions and save the information. Additionally, the user can apply a concept to a rule.

Figure 8A:
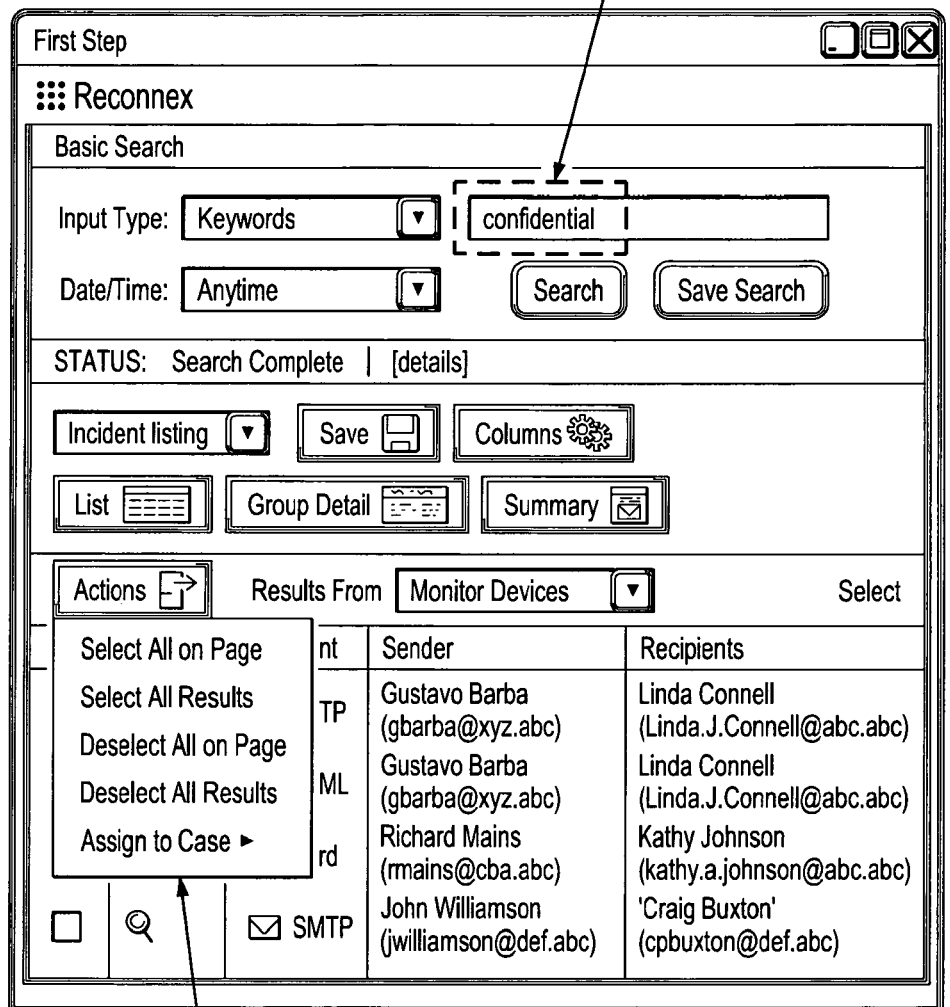

FIG. 8A is a simplified screenshot illustrating the first step in an example flow for the concept builder. As illustrated in this case, there is a search on a single keyword ['confidential'] and the keyword becomes the root term. FIG. 8B is a simplified screenshot illustrating a search on multiple keywords, where the root term is selected. In this case, the multiple keywords are 'confidential coyote' and a prompt is offered for the end user to initiate the concept builder protocol in the event of no search results being selected.

Note that for multi-keyword searches or incident lists used as starting points, a collection of meaningful terms [potentially with frequencies] is presented to the end user. The end user [or administrator] can pick one with which to move forward. Such activities would not necessarily be applicable to single-keyword searches, as the searched keyword can become the root term.

Figure 9A:
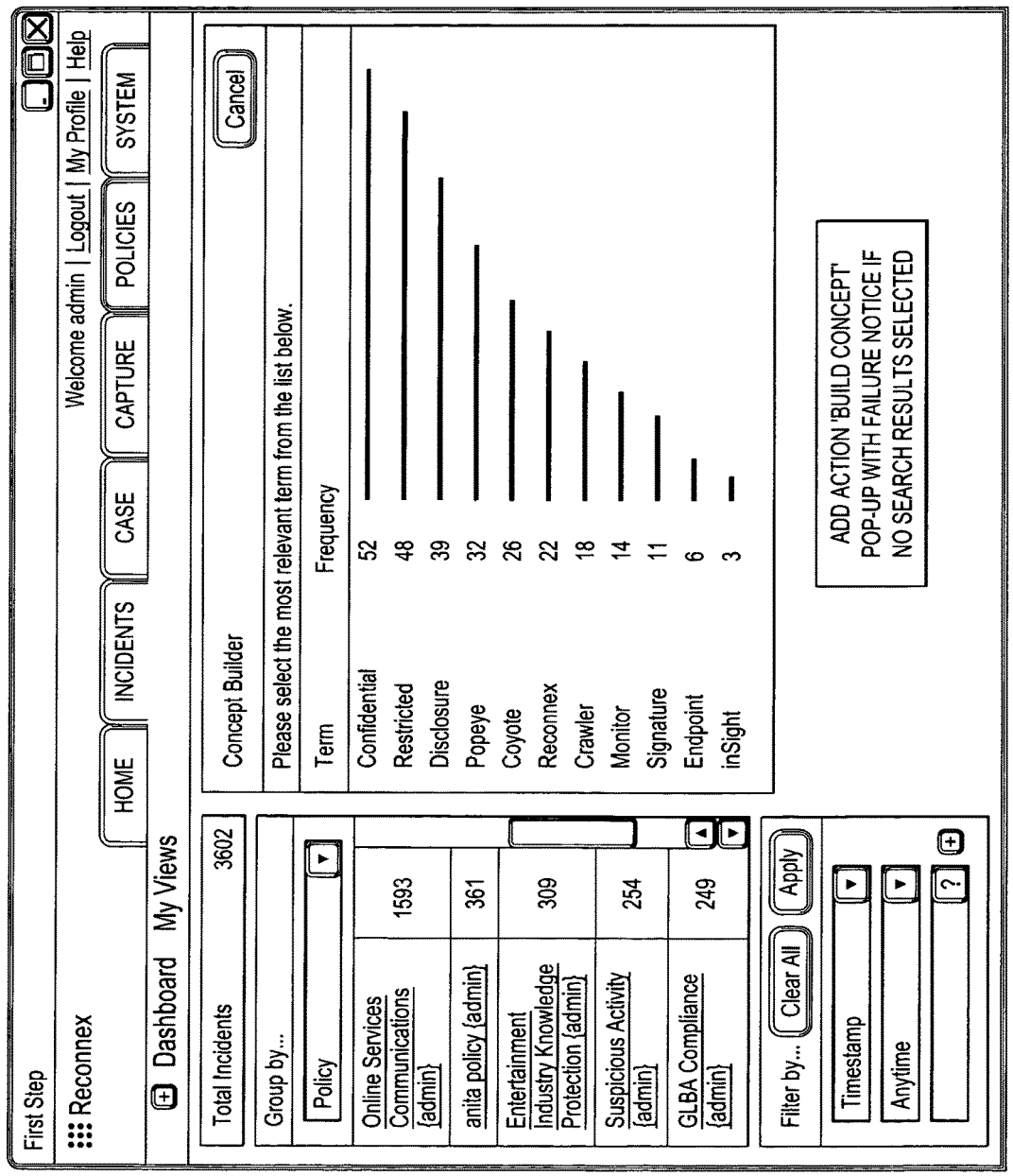
Figure 9B:
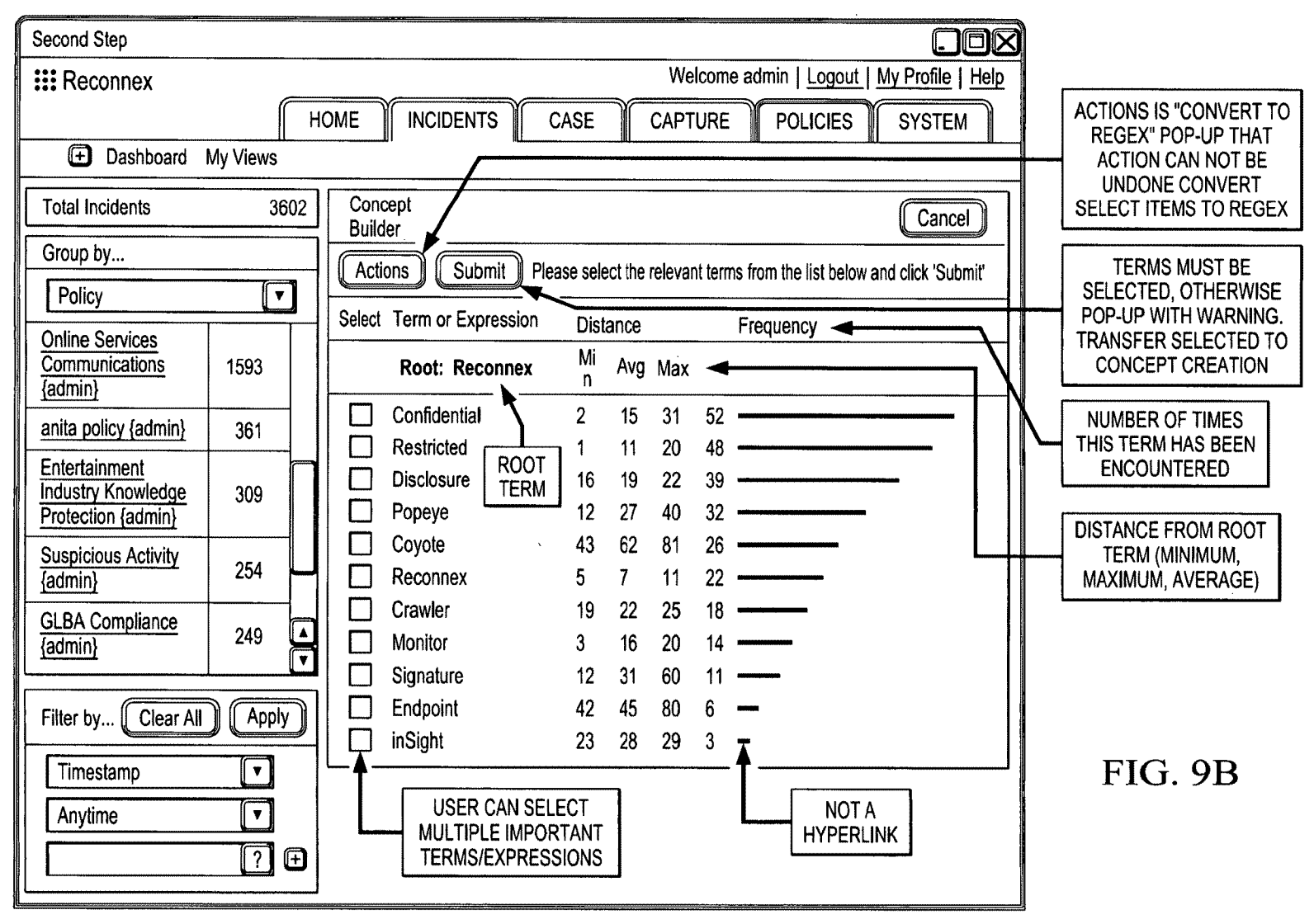

FIGS. 9A-9B are simplified screenshots illustrating a root terms selection aspect of example embodiments of the present invention. These two FIGURES can be thought of as first and second steps (respectively) in a process for concept building. Illustrated in FIG. 9A are a number of terms and the frequency of those terms. In addition, a number of policies are listed on the left-hand portion of the screenshot. In the illustration of FIG. 9B, a number of parameters are highlighted (distance from root term (min, max, average), number of times this term has been encountered, actions to convert select items to regular expression [regex], an area to select multiple important terms/expressions, etc.). This represents some (not all) of the potential options that may be afforded to an end user in performing the concept building operations of the present invention.

Note that the problem in identifying a document is in not only finding key terminology being used, but also the intent or the context associated with the document. Consider an example in which a security professional is relegated the task of securing or managing all documents associated with a given term. In this instance, the term is Reconnex (which is a technology Corporation that is wholly owned by McAfee, Inc. of Santa Clara, Calif.). This term has a number of related words that are often used to either describe the term, or in many cases are simply associated with this specific term. Note that in many instances, the security professional has little knowledge about what a particular term means or what terminology should be associated with that targeted term. Example embodiments of the present invention can identify important terms, and then build relationships to other terms in order to generate a concept. In FIG. 9B, the illustration is depicting a set of documents that the system has captured. In this sense, the capture system of the present architecture has found meaningful terms and identified the frequency of each of these terms.

Initially, a security professional or end-user may initiate a concept builder protocol by triggering a search. In operation of an example flow, an end-user may perform a search on a keyword. The keyword becomes the root term. Furthermore, the user may further characterize the keyword, using various Boolean connectors, or various other parameters that may be configured. For example, the user may request documents related to the keyword, but only review documents that have left a domestic territory (e.g., outside of the United States). The end user's goal in this hypothetical is to review a body of documents that have left the country. From this body of documents, we can construct a set of terms that have a relationship to each other and from there, the concept can be created and this can form the basis for one or more rules.

Ultimately, in terms of a policy, an end-user would like to know the intent of the document, as well as the context or the syntax in which one or more terms are being used. In this sense, policy decisions in the present invention can be determined through relationships of terms within the documents. The capture system of the present invention [which allows data mining to occur], allows an end user to find the relevant concepts or classes (along with words related to these concepts or classes) and which relationships these items should have in order to correctly classify or identify the document type.

Returning back to FIG. 9B, this screenshot illustrates the second step in a process associated with concept building. As is being depicted, a root term is selected and a relationship of other terms is identified. The notion is to build a collection of terms around the root term that makes sense around this collection of documents. FIG. 9B is also showing that we have captured a dictionary of terms that forms some logic for this root term. The captured terms, and their relationships to the root term, can form the basis for policy configuration, and for policy decisions. As used herein in this Specification the term 'dictionary' is inclusive of any object, storage element, or item that stores data to be used in making decisions that affect data management.

Figure 9C:
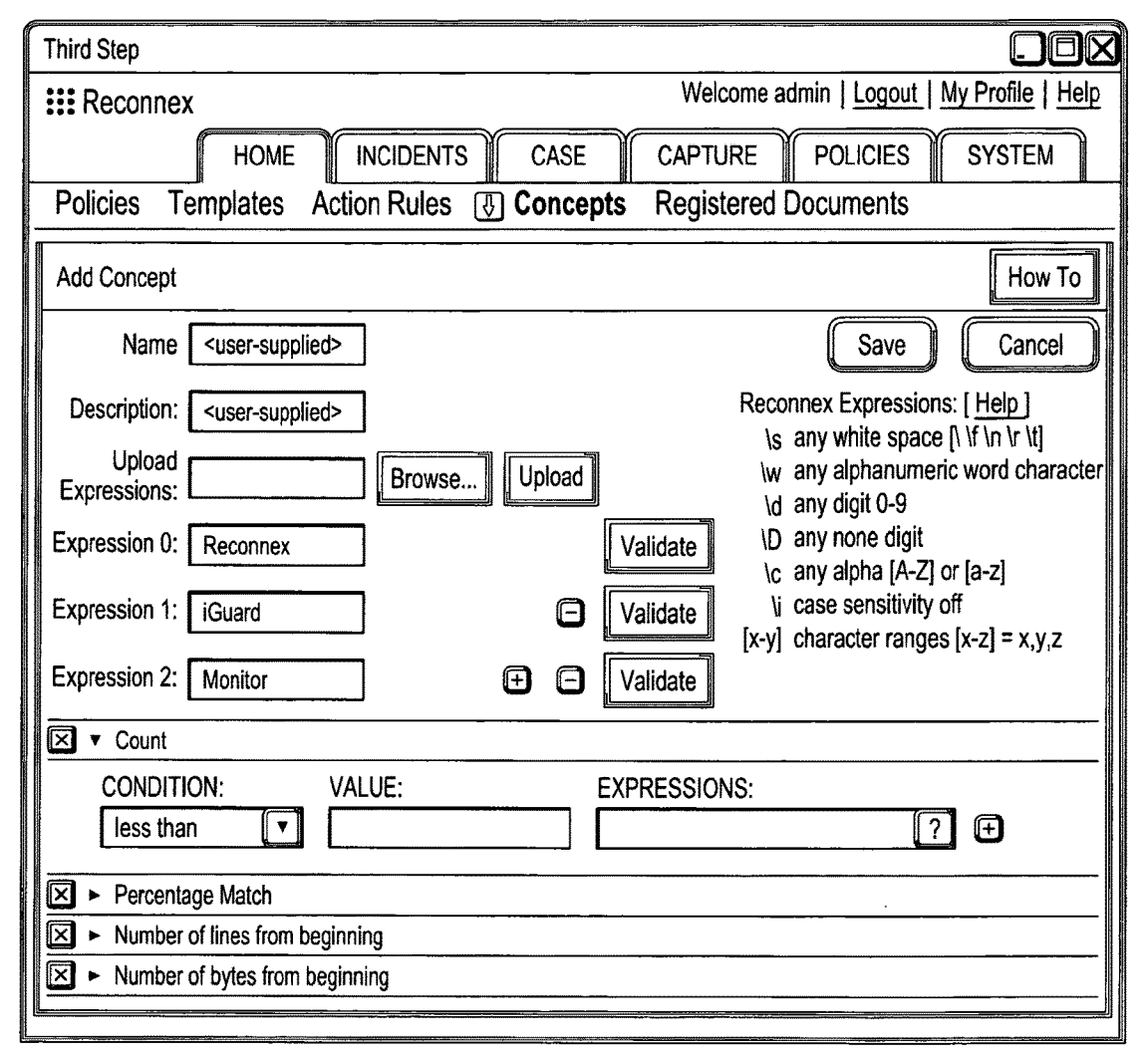

FIG. 9C is a simplified screenshot illustrating the third step in the concept building process. In this illustration, a transfer occurs for the terms and expressions, along with distances to the concept creation. In this example, the user has decided to include expressions associated with the root word Reconnex. Initially, the security professional did not know what the associated dictionary for this root term would include. In this example, the same security professional was tasked with protecting the intellectual property associated with this root term. By using the architecture outlined herein, the security professional has developed a collection of terms as shown (e.g., coyote, crawler, monitor, confidential, etc.), which have some relationship to the root word Reconnex. These terms may be leveraged in order to build out a concept.

The natural resolution to developing the dictionary and the associated relationships is to make policy decisions based on this information. For example, a security professional or an administrator of the system may configure the architecture such that if any selected number (e.g., three) of the dictionary terms are identified with the document, then that document is tagged appropriately. The document now has the identification, via the tag, as a sensitive item for this particular concept. From this point, a rule or a policy may be developed in order to manage or control the movement of this document. In this sense, a method of intelligent extraction is being performed. The security professional, has been given building blocks, which allows him to focus on defining policies, as opposed to worrying about all the terms or conditions that must be satisfied to trigger the capture of a Reconnex document.

Thus, in this example, we assume that the security professional had no idea about the relevant terminology for the root term for which he was given. The natural question that such a scenario would ask is how to determine the relevant terminology that relates to this root term. The architecture of the present invention can collect the body of documents, find a collection of meaningful terms that appear in these documents, select a root term from these terms, and the system can determine the other terms that have a relationship to the root term. From this point, the security professional understands that he has a set of terms within these terms, which can be used to build a concept that can be described to the system. If given the concept, the system can respond by automatically marking documents internally: documents that contain those terms and/or relationships. Policies can then be developed or employed in order to further control these captured documents, or these identified items. In a broad sense, a framework is provided for security professionals to use to intelligently capture/manage items they seek.

Figure 10A:
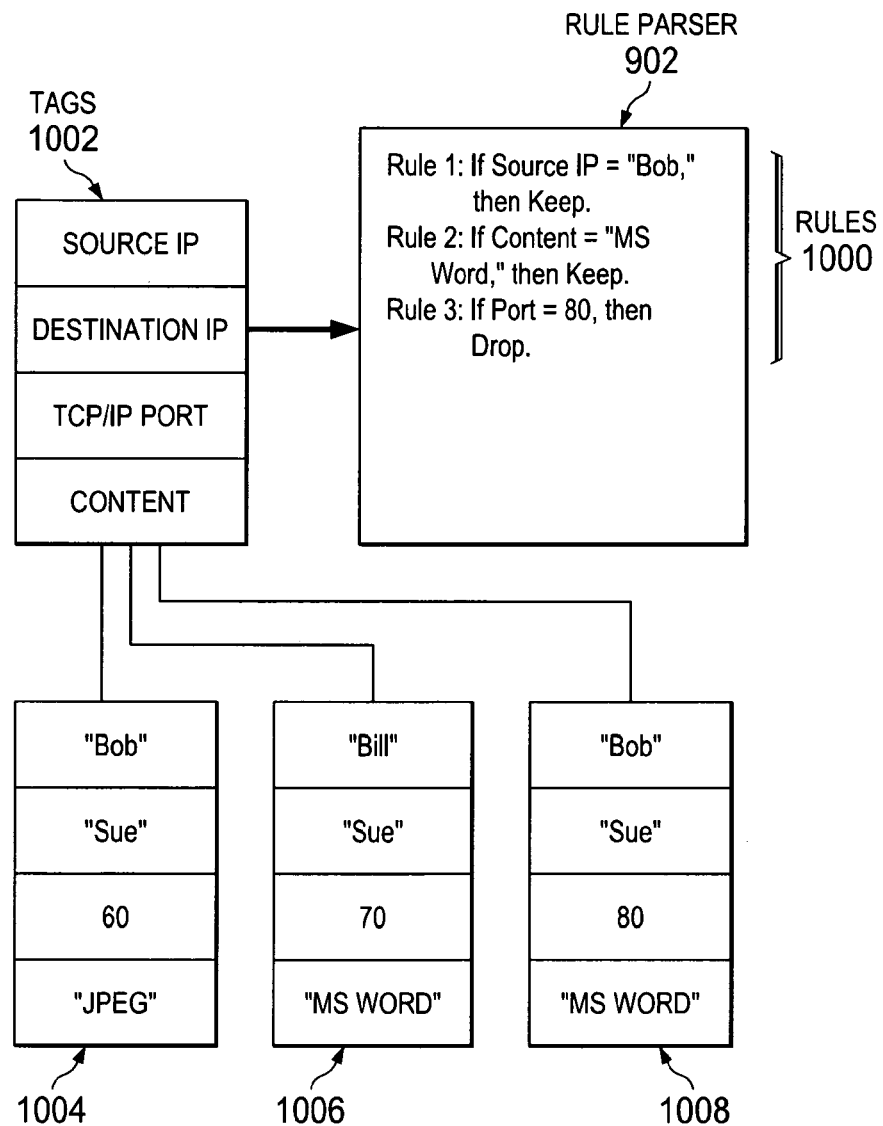
FIGS. 10A-14 are simplified block diagrams of various aspects of the communication system in accordance with example embodiments of the present invention.

FIG. 10A provides an illustration of the operation of a rule parser 902. Rule parser 902 applies a set of rules 1000 to a set of tags 1002 associated with objects. For example, given rules 1000, the object described by tag 1004 is kept because it satisfied Rule 1: its source IP is associated with Bob. The object described by tag 1006 is kept because it satisfied Rule 2: its content is an MS Word document. Additionally, rules are not necessarily orthogonal, i.e., one tag can hit more than one rule, and rules can have a precedence or priority order. The object described by tag 1008 hit all three rules, so it is kept or dropped depending on which of the three rules has precedence. If either Rule 1 or 2 has precedence over Rule 3, then the object is kept, otherwise, it is dropped in this example.

Figure 10B:
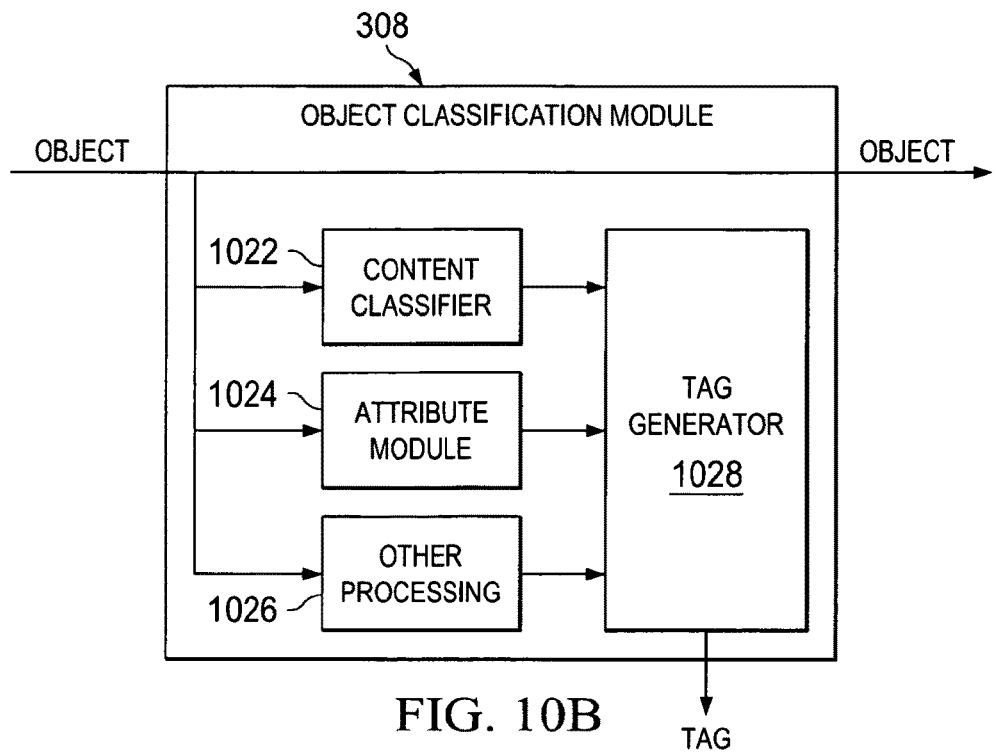

An embodiment of object classification module 308 is illustrated in FIG. 10B. Objects arriving from object assembly module 306 are forwarded to content store 502 and are used to generate tags to be associated with the objects. A content classifier 1022 determines the content type of the object. The content type is then forwarded to a tag generator 1028, where it is inserted into the content field described above. Various other tasks, such as protocol and size determination, are represented by another processing block 1026. An attribute module 1024 generates an attribute index that is insertable into an index field of a tag generated by tag generator 1028.

Figure 11:
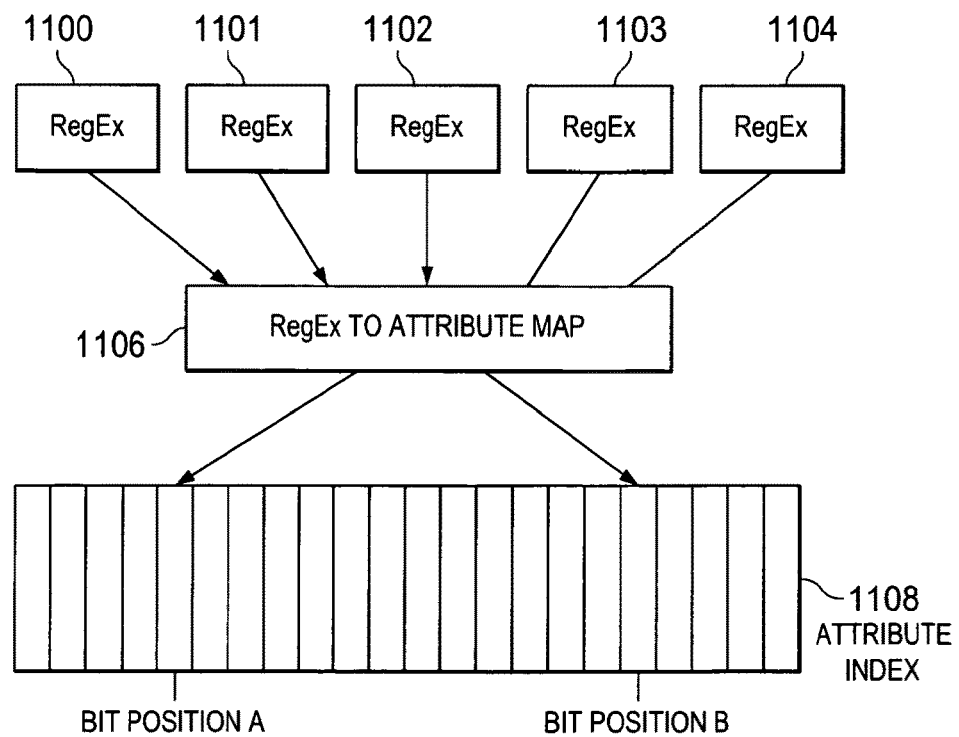

FIG. 11 illustrates an example attribute index 1108 in accordance with an example embodiment of the present invention. A plurality of regular expressions (labeled RegEx 1100-1104) are mapped to attributes using an attribute map 1106. For example, if regular expressions RegEx 1100-1102 can represent credit card patterns, then these regular expressions would map to a credit card number attribute. Regular expressions 1103 and 1104 may represent phone number patterns and would map to a phone number attribute. A mapping of a regular expression to an attribute is the reservation and usage of that attribute, as implying a successful matching of the regular expression.

Attribute index 1108 can be used to represent the attributes in a compact form. Attribute index 1108 may be implemented as a bit vector with a vector of bits having one-bit position associated with each defined attribute. In one embodiment, attribute index 1108 is 128 bits and 128 separate attributes are definable with this index and occur independently of one another.

The association of attributes to bit positions may be maintained in a table. For example, such a table may associate bit position A with the credit card number attribute and bit position B with the phone number attribute. Since, in this example, regular expressions 1100-1102 map to the credit card attribute, observing any one of the patterns defined by RegEx 1100-1102 causes a captured object bit position A to be set to show the presence of a credit card number in the captured object.

Setting a bit position is done by changing a bit either from "0" to "1" or from "1" to "0" depending on which value is the default. In one embodiment, bit positions are initialized as "0" and are set to "1" to show the presence of an attribute. Similarly, since regular expressions 1103 and 1104 map to the phone number attribute, observing any one of the patterns defined by RegEx 1103 or 1104 causes bit position B to be set to show the presence of a phone number in the captured object.

Figure 12:
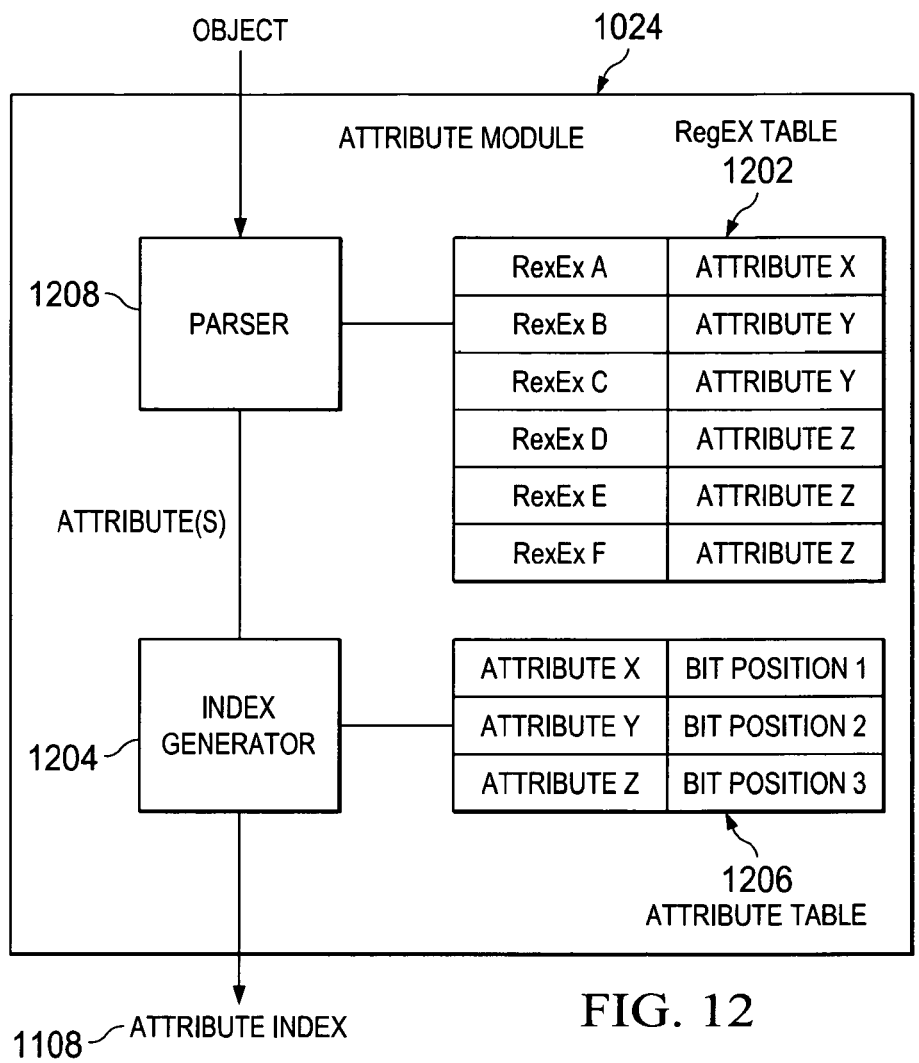

An embodiment of the attribute module is illustrated in FIG. 12. The input of attribute module 1024, as set forth above, is an object captured by the object capture and assembly modules. The object may be a word document, email, spreadsheet, or some other document that includes text or other characters that represent a pattern expressed as a regular expression.

The text content contained in the object may be extracted to simplify the attribute tagging processing. The text content of objects includes only textual characters without formatting or application context. The object or text extracted from an object is provided to a parser 1208. Parser 1208 parses the object to identify which regular expressions appear in the object.

Parser 1208 accesses a regular expression table 1202 that lists all the regular expressions of interest. Parser 1208 can then determine which of the regular expressions appear in the object or the text extracted from the object. Regular expression table 1202 also associates each regular expression contained therein with an attribute. In this manner, regular expression table 1202 can function as the regular expression to attribute map 1106 of FIG. 11. For example, regular expression table 1202 as shown in FIG. 12 maps regular expression A to attribute X; regular expressions B and C to attribute Y; and regular expressions D, E, and F to attribute Z.

Since regular expression table 1202 contains the regular expressions and their attribute mapping, parser 1208, by parsing the regular expressions over the object, can determine which attributes are present in an object. In one embodiment, the parsing is done faster by parsing only the regular expressions related to attributes that have not yet been found in the object. For example, if the parser finds a hit from regular expression D in the object, then attribute Z is found in the object. This makes parsing using regular expressions E and F unnecessary, since attribute Z is already hit.

Parser 1208 outputs a list of attributes found in an object. As explained above, an attribute is a category of patterns such as credit card number, phone numbers, email addresses, bank routing numbers, social security numbers, confidentiality markers, web sites, the names of executive officers of a company, medical conditions or diagnoses, confidential project names or numerical strings indicating salary or compensation information.

Attributes found in the object are provided to index generator 1204. Index generator 1204 generates attribute index 1108 described with reference to FIG. 11. Index generator 1204 accesses an attribute table 1206, which contains a mapping of attributes to bit positions of attribute index 1108. For example, in FIG. 12, attribute X is mapped to bit position 1, attribute Y is mapped to bit position 2, and attribute Z is mapped to bit position 3.

If an object contained regular expression A, D, and F, then parser 1208 would first note that attribute X has been hit. When recognizing regular expression D, parser 1208 would note that attribute Z has been hit. Since these are the only attributes in this abbreviated example, parser 1208 would provide attributes X and Z to index generator 1204. According to the attribute table 1206, the index generator would set bit positions 1 and 3 of attribute index 1108. Thus, for this simplified example, attribute index 1108 would be "101" first bit positions 1 through 3.

The generation of attribute index 1108 and the use of the specific mapping tables shown in FIG. 12 is just one example of attribute module 1024 performing attribute tagging. In another embodiment, each possible attribute has a separate field in the tag associated with the object indicating whether the attribute is present in the object. Thus, an attribute index may be thought of as a summary of a plurality of attribute fields. Alternatively, each bit position of the attribute index may be thought of as a separate field. Various other implementations and visualizations are also possible.

Figure 13:
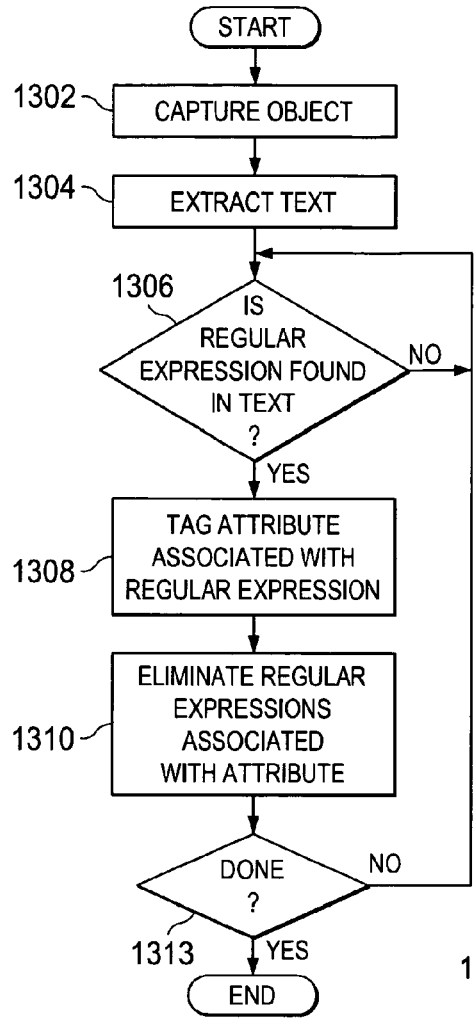

An embodiment of a method for attribute tagging is described by FIG. 13. In block 1302, an object is captured. In block 1304, the textual content is extracted from the object. In block 1306, a determination is made as to whether a regular expression appears in the extracted text.

If the regular expression under consideration does not appear in the text, then processing continues again at block 1306 using the next regular expression on the regular expression list. However, if the regular expression under consideration does appear in the text, then in block 1308, the attribute associated with the regular expression is tagged. This may be done by setting a field or position in an index in a tag of metadata associated with the object.

In block 1310, all other regular expressions associated with the observed attribute are removed from future consideration with respect to the object. In block 1313, a determination is made as to whether attribute tagging has completed with respect to the object. If no regular expressions remain to be compared with the extracted text, then the attribute tagging is complete and processing terminates, as shown in block 1313. Otherwise, processing continues at block 1306 with the next regular expression on the list evaluated.

Figure 14:
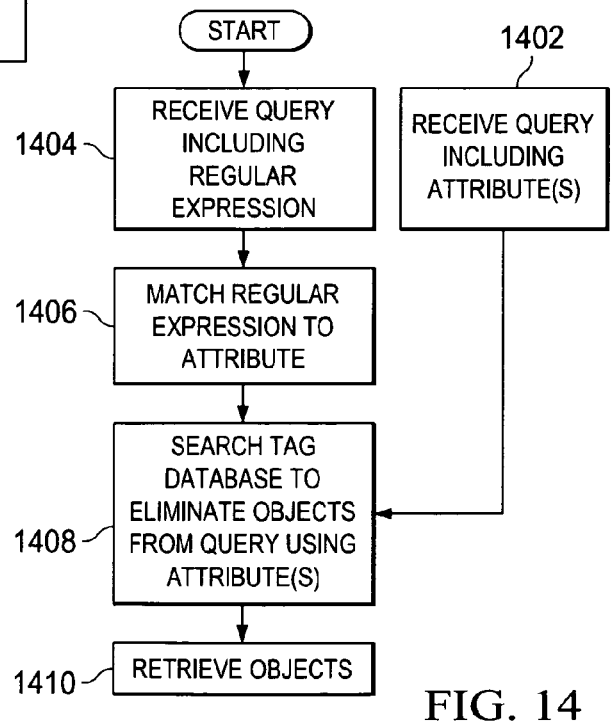

FIG. 14 illustrates an example flow for querying captured objects. In block 1402, a query is issued. The query may be received by a capture device via a user interface. The process described with reference to FIG. 13 may be implemented entirely within the user interface, within some query module of the user interface, or as a separate query module.

In regards to a query, in addition to other limitations [such as content type, size, time range, etc.], one or more documents may contain one or more attributes for which the query is seeking. For example, the query could be for all Microsoft Excel documents from the last week containing credit card numbers (credit card numbers being an attribute). The received query may only include one or more regular expressions, as shown in block 1404. In block 1406, the regular expression is matched to an attribute, if possible. For example, if the regular expression in the query is only satisfied if another regular expression associated with an attribute is satisfied, then objects having this attribute tagged are more relevant for this query than objects in general. In particular, any object satisfying the regular expression would also satisfy the attribute. For example, a query for a specific credit card number or range can satisfy the credit card attribute.

Whether provided by the user, or identified based on the query, in block 1408, the appropriate attribute or attributes are used to eliminate objects from the query. In one embodiment, a search is done over the appropriate attribute field or index bit positions in the tags in the tag database. If the attributes being sought are not shown as present in an object, the object is eliminated from further consideration for this query.

In block 1410, the objects remaining after elimination at 1408 are retrieved from the medium they are stored on (such as a disk) into memory. They can now be presented to the user as query results, or object can be further eliminated by parsing the retrieved objects for the specific regular expression queried for, where no specific attribute was named. Alternatively, only a link to the objects remaining after elimination are retrieved.

In one embodiment, the attributes are completely user-configurable. A user interface provides an attribute editor that allows a user to define attributes by creating an attribute and associating a group of one or more regular expressions with the created attribute. The capture device may come preconfigured with a list of common or popular attributes that may be tailored specifically to the industry into which the capture device is sold.

In one embodiment, a capture device may create new attributes automatically. For example, a capture device may observe that a certain regular expression is being searched with some threshold frequency (generally set to be above normal). The capture device creates an attribute to be associated with this regular expression and begins tagging the newly defined attribute when capturing new objects. In another embodiment, a capture device may suggest that a new attribute be created when a regular expression is searched frequently. In yet another embodiment, a capture device may suggest that an attribute be deleted if infrequently used to make room for another more useful attribute.

In terms of the query generation, example embodiments of the present invention allow objects and/or their associated metadata to be searchable upon request. For example, emails, documents, images, etc. may be processed by a capture system and searched.

There are a number of backend operations (e.g., implemented in algorithms) that can be performed in order to effectuate the concept building activities outlined herein in this Specification. These intelligent grouping mechanisms offer an optimal sorting of important terms for purposes of managing data. Certain embodiments of the present invention can offer an architecture that intelligently identifies common concept groupings within a document set. Such an architecture can identify the important words and, furthermore, if given a word(s), the system can gather related terms, which are associated with that word. In a general sense, an end-user is empowered with the ability to probe for significant relationships within a document set.

Example embodiments of the present invention can begin with a collection of documents, for example, discovered through searching of the system, or identified through matching criteria associated with a root term. Capture system 200, or capture system 300, can be leveraged in order to harvest this collection of documents. The architecture of the present invention can take this process a further step by taking this collection of documents and finding a collection of meaningful terms, which are common to the word(s). Hence, given the root term, other terms are found, which have some relationship to the root term.

Thus, example environments of the present invention can provide a framework for discovering terms that are related to a root term. From this point, any number of activities can be initiated, for example with regards to configuring rules or for concept building to adequately organize data. The second aspect of example embodiments of the present invention offers a highly optimized and compressed mechanism to handle a large volume of words in the context of one or more of these activities.

Figure 15:
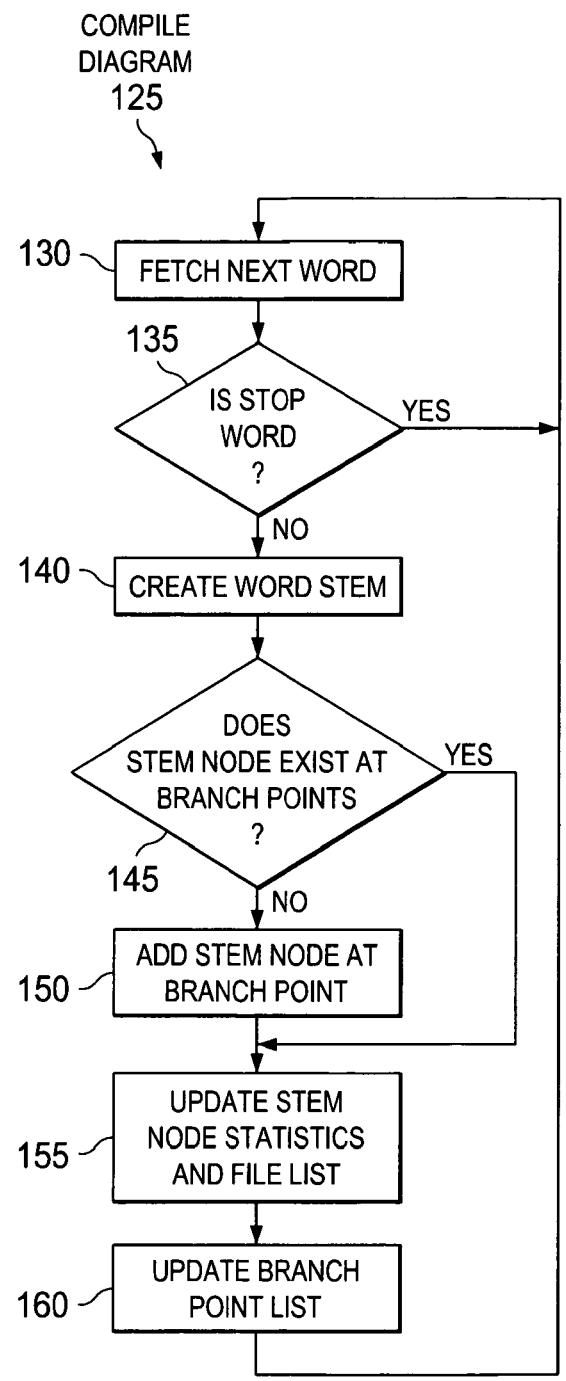
FIG. 15 is a simplified flow diagram of one example operation for intelligently grouping terms.

Turning to FIG. 15, illustrated is a simplified flowchart that outlines a compile diagram 125 associated with example embodiments of the present invention. The diagram begins at step 130, where a next word is fetched. If this is a STOP word at identified by step 135, then the flow cycles back to the first step. If it is not, then the flow moves to step 140, where a word stem is created. At step 145, a query is initiated as to whether the stem node exists at branch points. If it is not, then at step 150, a stem node is added at a branch point. If the answer to this query is 'Yes', then the node statistics and the file list are updated at step 155. At step 160, a branch point list is updated, and the flow cycles back to the first step in this diagram. Note that some of the teachings of this compile diagram will be more evident as some example configurations are discussed below with reference to FIGS. 16A-16D.

A common theme in data mining is trying to find similarities amongst documents. In essence, the challenge is to find documents that share similar text and, therefore, should be classified as similar to each other. The example schematic configurations of FIGS. 16A-16D depict a branch point and an added stem as part of a group of words (A, B, C, D, E).

Figure 16A:
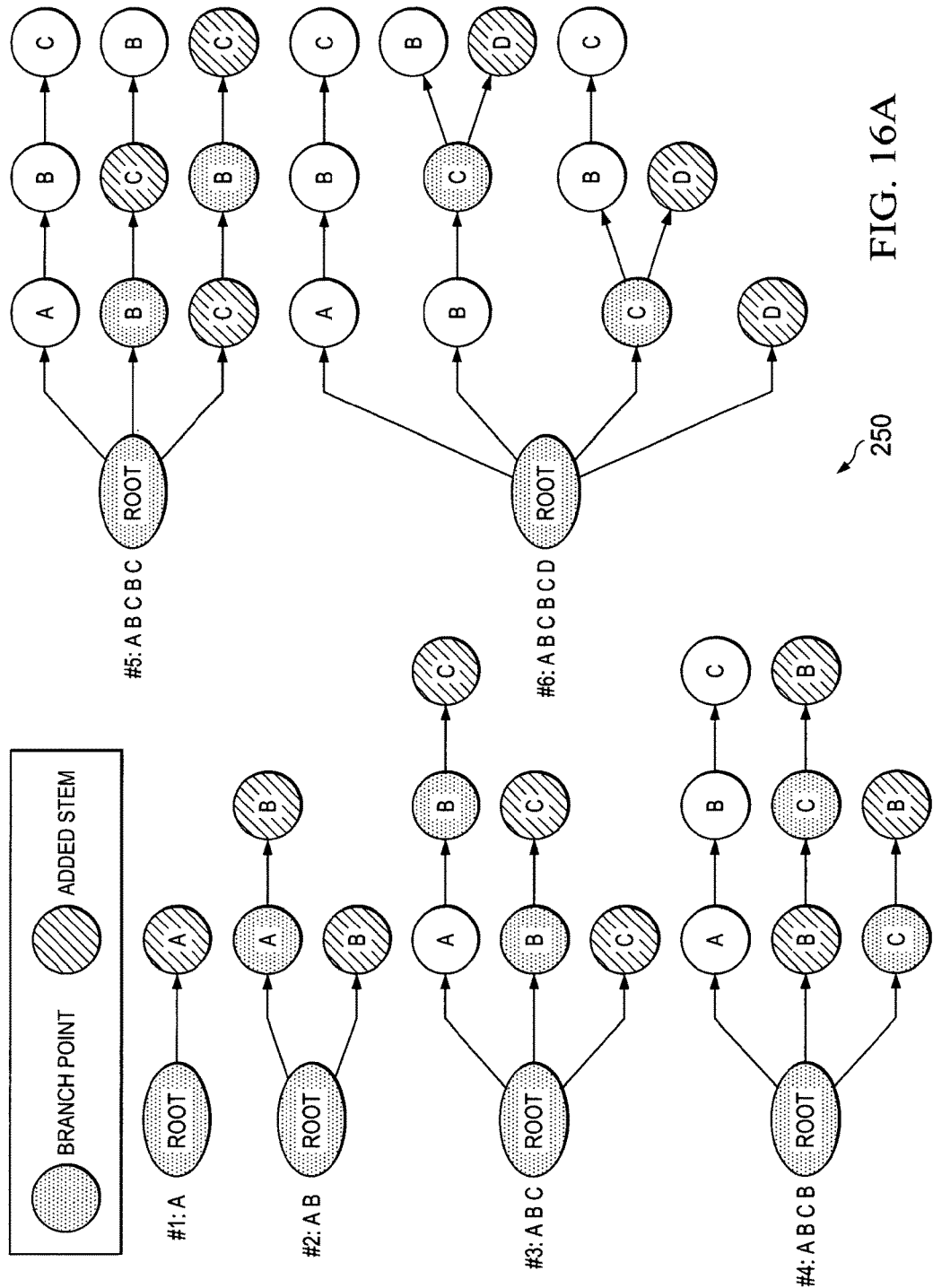

FIG. 16A illustrates a first configuration 250 that includes six example relationships between several words. Each relationship includes a root, along with branch points and added stems. By using the teachings of the present invention, the range of words (along with their respective distances) can be configured for a specific root term. Additionally, a number of related expressions (e.g., verb conjugations, prepositional phrases, etc.) or related words can be configured for a particular root term. The root term in this example connotes a word starting point.

The first example relationship (#1) includes a root 'A' by itself. The second example includes the same root, but with the addition of 'B' that are now branch points. The third example adds letter 'C' to this configuration. At this point, this is a fairly simple process. Subtly, the configuration changes when more than three items are present. The important point to acknowledge is that if this configuration is not limited intelligently, it can grow exponentially large.

Turning to the example of #4, the depiction is illustrative of a query that asks whether the stem exists at a branch point. Furthermore, a branch point list is updated at this junction, and this entails keeping track of the previous branch points, which include the root for an 'N' window. In this case, the 'N' for the system is three such that there are only three branch points permitted.

In example #5, a single stem 'C' was added to the configuration. However, the configuration did not change much, because there was some repetition involved. Also illustrated in #5, all combinations of these five words have been covered. Moving on to the configuration of example #6, we can see that the branch points begin to break up and are not as simple as the previous examples. The addition of 'D' to the branch points spawns a bifurcation, as shown.

Figure 16B:
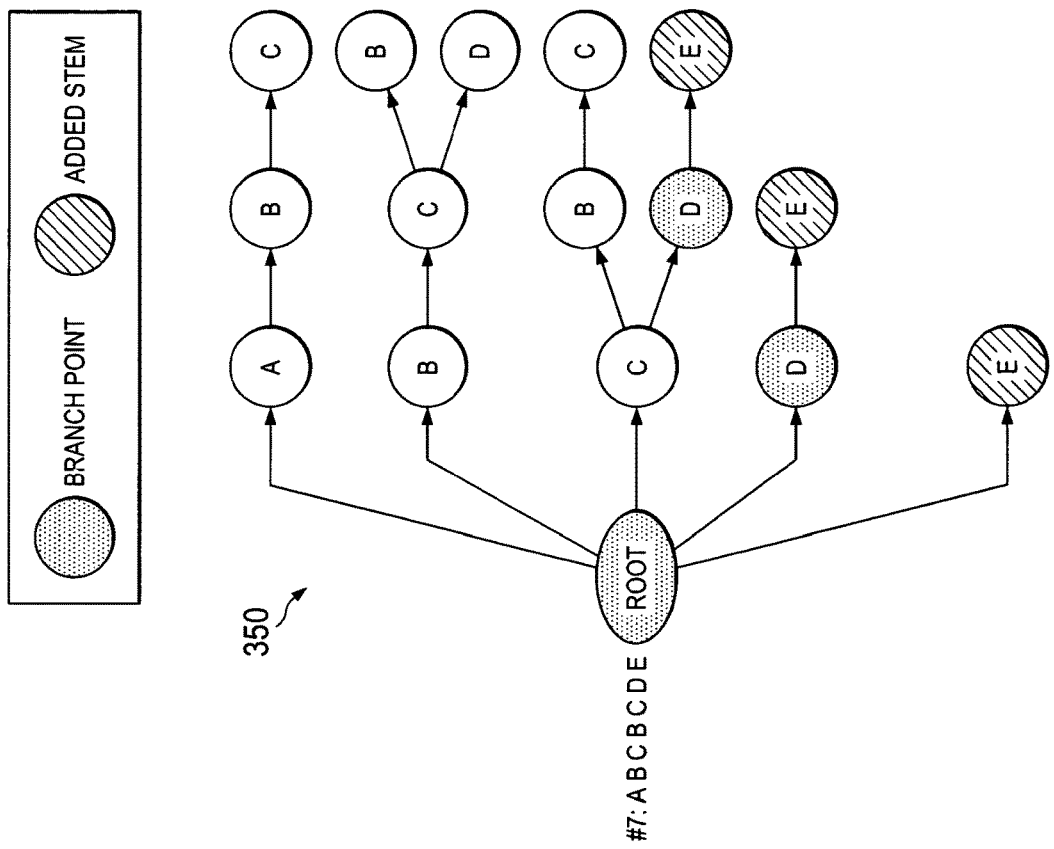
Figure 16D:
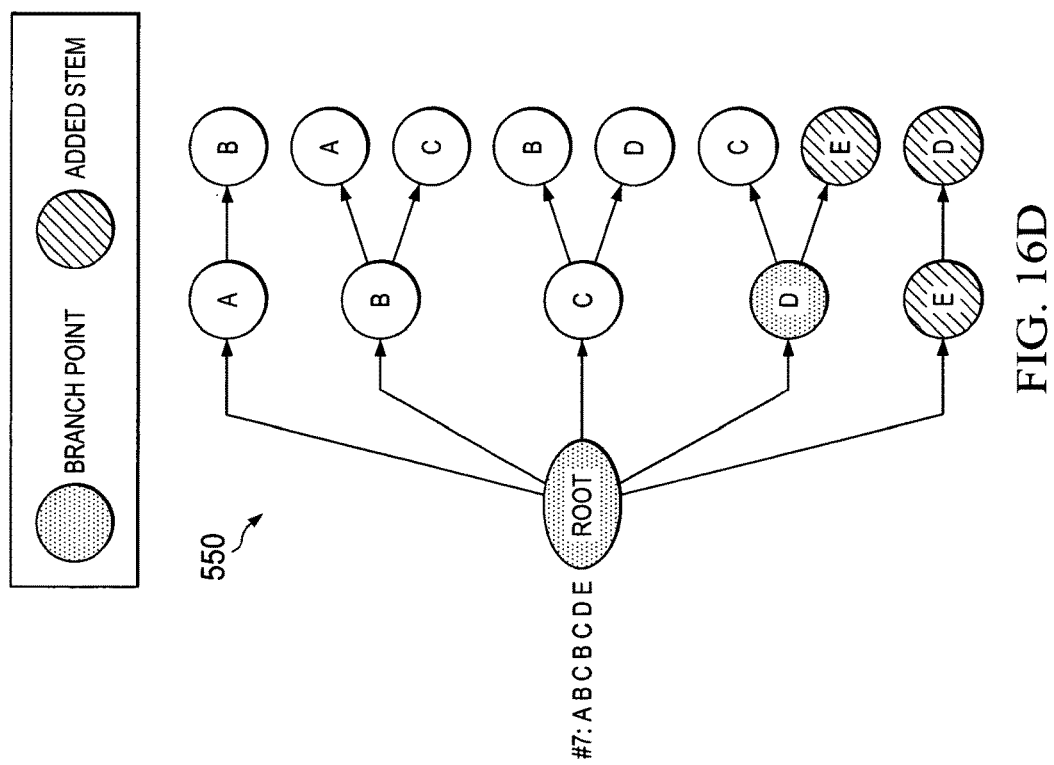

FIG. 16B illustrates a second configuration 350, where a new word 'E' has been added to the configuration. Note that there are never more than three words "deep" for this particular configuration. There is an 'N' number of possible word combinations, but this is somewhat constricted by the word document because there is a finite number of word choices.

In this particular case, the way that the word organization (i.e., intelligent term grouping) would work is as follows. In placing the particular stem words (A, B, C, D, etc.), the architecture can identify the locations within a document where these occur, along with their frequency. The system can also note the total number of appearances for the word or for the combination of words. Each possibility can be thought of as a vectoring, and the system can perform dot product operations on selected words and word combinations. Each possible combination in the tree can be thought of as a vector. Dot product operations can be performed in order to identify any potential overlap.

FIG. 16C illustrates another configuration 450, where again a root term is selected in #1. In this example, we are restricted to a two-word combination. Note that three word and four word combinations are also permissible, but in this particular example, a two-word example suffices. In example #2, the 'B' is added to the configuration. Note that the reverse permutation is also added in this example. This flow is similar to the other configurations discussed previously, but in this case, these permutations are being addressed. Note that these examples can be easily followed, as these trees follow a pattern similar to the trees discussed above. Note also that the third, fourth, and fifth configurations share commonalities. In one sense, the system has restricted the ability of these configurations to grow uncontrollably. In these three examples, the tree does not necessarily change; however, the statistics related to these words are updated. Note also that all of the configurations of FIG. 16C are only two deep and all permutations have been included can properly covered. A configuration 550 of FIG. 16D adds yet another term, but still maintains the two-deep modeling.

In operation of a simplified example, a document collection may be initiated through various protocols. For example, a simple rule protocol could be used to gather all documents sharing some commonality (for example, all Word documents communicated over a certain protocol). From this point, an algorithm may be used in order to evaluate this group. The algorithm can further extract terms to show items that are related to a given term (everything related to 'B'). In essence, the algorithm can quickly reference node 'B' and it now has a list of related terms, along with their frequency and other parameters of interest. Note that all this information may be suitably compressed, or processed, or referenced in an efficient manner such that intelligent data management occurs. Such a system may further enhance redundant processing activities, which reduces the processing burden on the system. In one general sense, the protocol outlined herein represents a rather small footprint in terms of memory, but it is fast in terms of execution.

Note that the architecture provided by example embodiments of the present invention enhances the abilities of a security professional, who was relegated the task of managing data. For example, if given a single root term [such as 'A'], the system can quickly identify 'B' and 'C' as important related terms. The system can take this a step further in identifying relationships between any of these terms. For example, within the document set, a security professional can search for the A-B relationship. This would allow a security professional to enjoy a fuller scope of control, or a more comprehensive evaluation for this particular term 'A.' It should be appreciated that the security professional, in many cases, has little knowledge about specific, related terms and/or phrases, which are relevant to a sensitive piece of intellectual property. His objective is to protect the term in all its forms and, more specifically, to manage the underlying documents that include the term, while accounting for all possible variations and permutations for this term.

Revisiting the Google phone example from above, a security professional who is tasked with managing information related to this terminology would have to discover all components, employees, business units, etc. related to this term. This could theoretically require interviewing employees and/or a review of a voluminous amount of data. In leveraging the current architecture, a security professional can avoid much of this overhead.

The security professional can initiate a search with a single term (e.g., Android) and then be provided with the relationships to other terms, as illustrated by the configurations of FIG. 16. From here, the security professional now has a collection of terms that adequately describe the initial term (e.g., 'Google phone' or Android, etc.). These terms could then be used with rules, which may offer access control or restrictions on transmissions or any other management operations involving these terms. Thus, from a root term, the security professional has properly discovered other related terms, which describe that particular root term. The notion of interviewing people, or reviewing large amounts of data, in order to discover these related terms has been eliminated.

Note that in one example implementation of the present invention, capture system 200 (and 300) includes software to achieve the optimal concept building operations and/or the state management operations, as outlined herein in this document. These capture systems may be included within a network appliance, as shown in FIG. 1, or provided as a separate component.

In other embodiments, this feature may be provided external to network appliances 14, 16, and 18 and/or capture systems 200 and 300 or included in some other network device to achieve this intended functionality. Alternatively, both of these elements include this software (or reciprocating software) that can coordinate in order to achieve the operations, as outlined herein. In still other embodiments, one or both of these devices may include any suitable algorithms, hardware, software, components, modules, interfaces, or objects that facilitate the operations thereof. This may be inclusive of appropriate communication protocols that allow for the effective exchange of data or information for achieving the concept building operations and/or the state management operations, as outlined herein.

Each or both of these elements (network appliances 14, 16, and 18 and/or capture systems 200 and 300) can also include memory elements for storing information to be used in achieving the operations as outlined herein. Additionally, each of these devices may include a processor that can execute software or an algorithm to perform the concept building activities and/or the state management operations, as discussed in this Specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Figure 17:
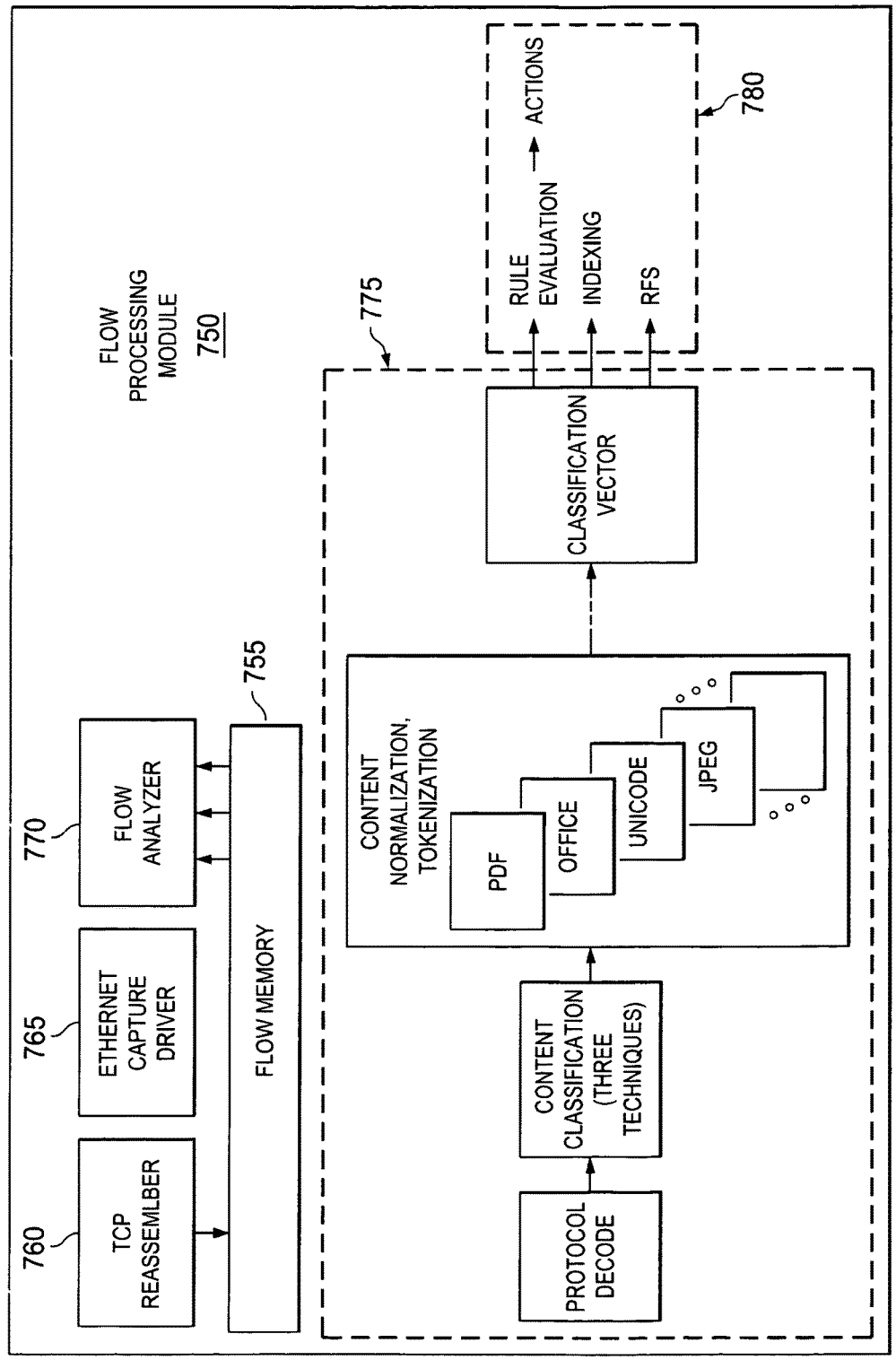
FIG. 17 is a simplified block diagram of a flow processing module for minimizing state in accordance with one embodiment of the present invention.

There is a classification engine that identifies protocols and content types and performs pattern-matching operations. FIG. 17 is a simplified block diagram of a flow processing module 750. Flow processing module 750 includes a flow memory 755 that is coupled to a transmission control protocol (TCP) reassembler 760, a flow analyzer 770, and an Ethernet capture driver 765. A general flow of various types of information can propagate through a flow memory 755, where rule evaluations, indexing, RFS, and other actions (generally depicted at 780) can be taken. Note that the number of states that can be traversed can be fixed in some embodiments of the present invention.

In one example implementation, flow processing module 750 is a deterministic finite state machine. In such a machine, for each pair of state and input symbol, there is one transition to a next state. The state machine can take in a string of input symbols. For each input symbol, it can then transition to a state given by following a transition function. When the last input symbol has been received, it can either accept or reject the string depending on whether the state machine is in an accepting state, or a non-accepting state.

In other embodiments, flow processing module 750 is not deterministic and/or finite and is not confined in any such way. This matching module can be included in any suitable software or hardware (e.g., a state machine). The classification engine can process a voluminous amount of data such that millions of patterns and expressions are evaluated systematically. Once the document is captured, the document can be quickly examined and matched for the presence of different tokens such that we can determine which tokens match the ones present in the document.

In one example implementation, flow processing module 750 may be included in capture system 200/300. Furthermore, flow processing module 750 may be part of the object classification module, as discussed herein. In alternative embodiments, flow processing module 750 is provided as its own separate component, where it may be coupled to capture system 200/300.

In example embodiments of the present invention, a state machine can be fed any number of patterns to evaluate. These patterns may be inclusive of expressions, or single words, or combinations of words. The state machine can employ the use of memory caches in evaluating a large amount of data.

Furthermore, flow processing module 750 can perform the following actions: protocol decode, content classification (several techniques), content normalization tokenization, signature generation, concept evaluation, classification vector [these items being generally depicted at 775]. Flow processing module 750 can also offer rule evaluation, capture filters, RFS, and real-time indexing, as is generally depicted at 780 of FIG. 17. All these actions can be accomplished using several items that may be included within flow processing module 750, including: protocol data unit (PDU) tokens, protocol signatures, content signatures, content dictionary tokens, concept tokens, and run time system (RTS) parameters. Note that flow processing module 750 can be optimized for cache/main memory hierarchy, as it can offer a single pass architecture.

As a general proposition, there are certain processes that example embodiments of the present invention can reduce in order to gain a performance advantage. This reduction can target duplicative states, where new states should only be generated if they are independent of existing states. In this sense, the architecture of the present invention attempts to manage state efficiently and minimize memory consumption.

In an operation of an example flow, a captured stream may propagate through flow processing module 750. At a first stage, the module can determine what protocol is present. The second stage of the flow involves determining the content type (PDF, JPEG, Word document, etc.). The third stage involves extracting words and phrases from those content types. At a fourth stage, signature generation occurs and, at the fifth stage, those words and phrases are analyzed against the concepts that have been defined for the system. Thus, incoming streams are matched against a multitude of tokens, which represent items of interest for the system. The important point in such an architecture is that an effective coordination must occur between the cache and other memory components in conjunction with the CPU. If this is not effectively coordinated, then such pattern matching might not be achieved in real time. Moreover, these processing operations should not be replicated over and over again, as the input stream should only be analyzed a single time.

Returning to the flow, internal records are generated at a sixth stage for classifying vectors. At a seventh stage, a rule evaluation occurs for this captured information. These first seven stages can be executed by flow processing module 750. In summary, flow processing module 750 is used to identify the protocol type, identify a content type, match against words and phrases of interest (e.g., tokens), match and mark a collection of terms that may be used to represent a concept, and evaluate the documents against a rule set.

Figure 18:
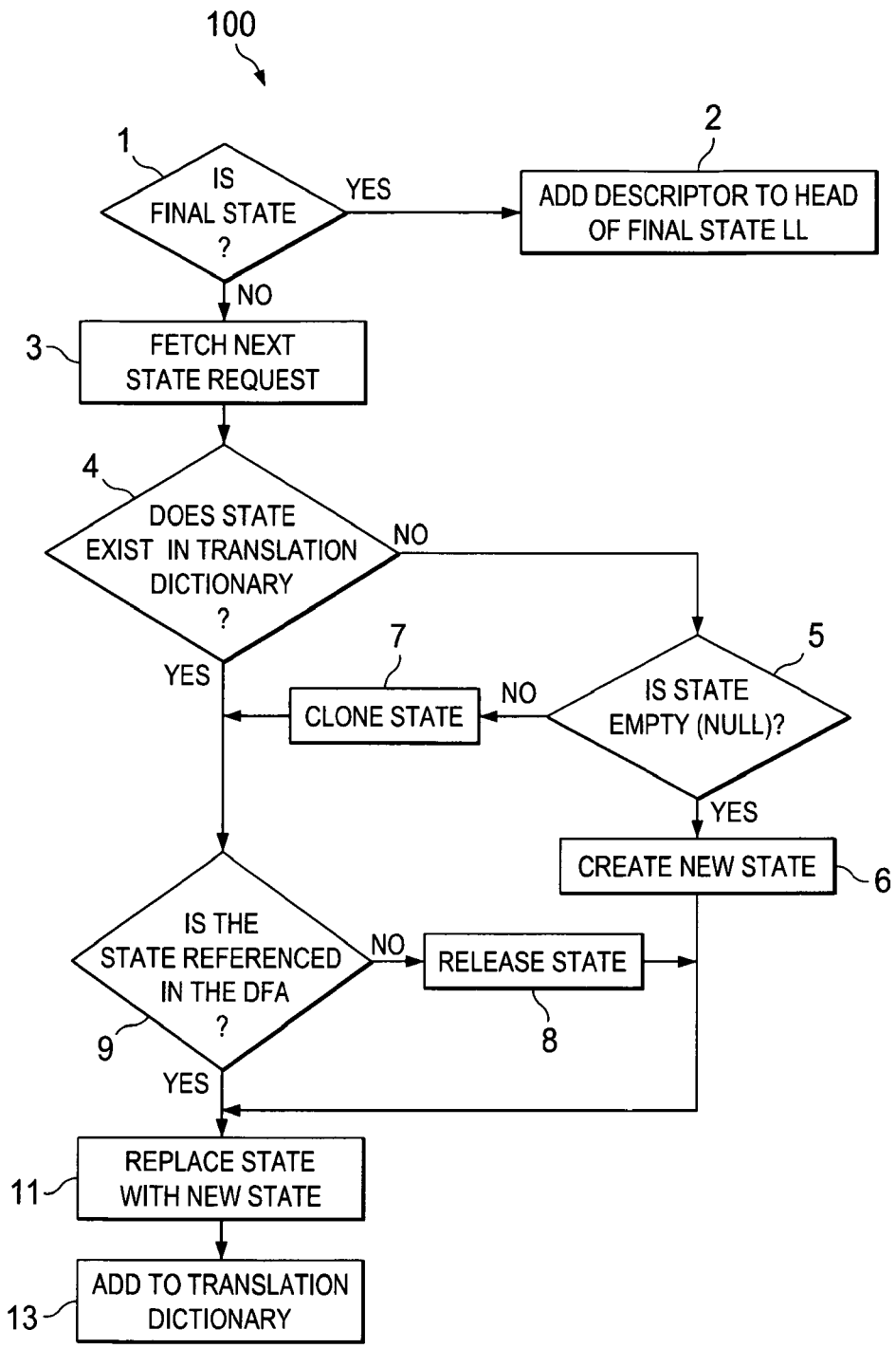
FIG. 18 is a simplified flowchart illustrating a series of example steps associated with the module.

FIG. 18 is a simplified flowchart illustrating a diagram 100 for compiling a rule into a given state table. The flowchart begins at step 1, where a query is initiated as to whether this particular item represents a final state. The flow can move to step 2, where a descriptor is added to the head of the final state. Otherwise, the flow may move to step 3, where the next state request is fetched. The flow then moves to step 4, where a query is initiated as to whether this state exists in any translation dictionary. If the answer to this query is 'No', then at step 5, it is determined whether the state is empty (null). If the answer to this query is 'Yes', then a new state is created at step 6. If not, then the flow moves to step 7, where the state is cloned.

At step 9, the query is initiated as to whether the state has been referenced in a deterministic finite algorithm (DFA). This algorithm is particular to this individual flow, as other procedures and other components may be used in executing some of the teachings of the present invention area. If this state is not referenced, then the state is released at step 8. If the state is referenced, then at step 11 the state is replaced with a new state. Also, an addition is made to the translation dictionary at step 13, and the flow returns to step 1.

Thus, in example embodiments specific to the format size and performance optimization, each state (in compressed notation) is organized into an ordered set with Boolean qualifiers for fast bisection lookup. The Boolean qualifier can identify whether the element is to be evaluated using '==' or '<=' qualification. More specific to state expression descriptor optimization, during compilation, state expression descriptors (actions) can be chained with an N to 1 single linked list. For example, given the N state expressions:

\d\d\d→D0; and a (N−1) collection of any three numbers to D(N), the total number of descriptors (actions) is N (and not 2N) because each (N−1) descriptor singularly references D0. This could be represented as:

123→D1\

321→D2→D0

112→D3/

As a general proposition, the architecture is capable of receiving a state request, determining whether the state exists in a translation dictionary, cloning (reproducing) the state if it is not in the dictionary, and adding the new state to the dictionary. Note that some of these activities will be made clearer once the subsequent figures have been discussed further.

Figure 19A:
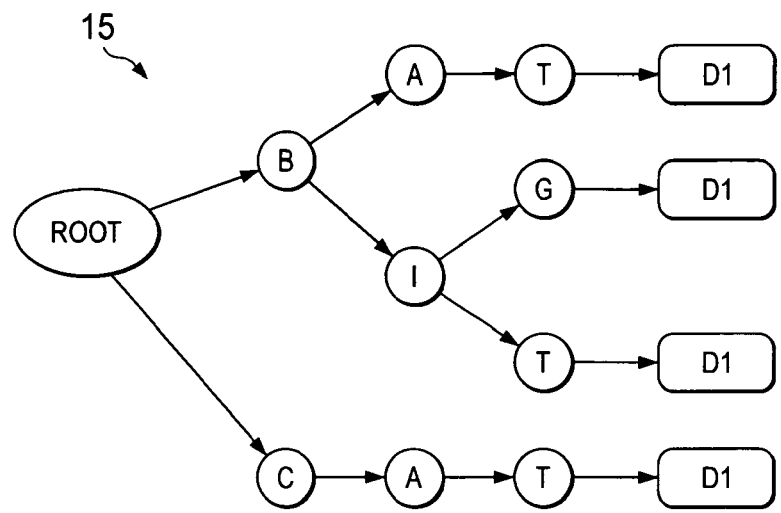
FIGS. 19A-19I are simplified configurations associated with intelligent state management.
Figure 19B:
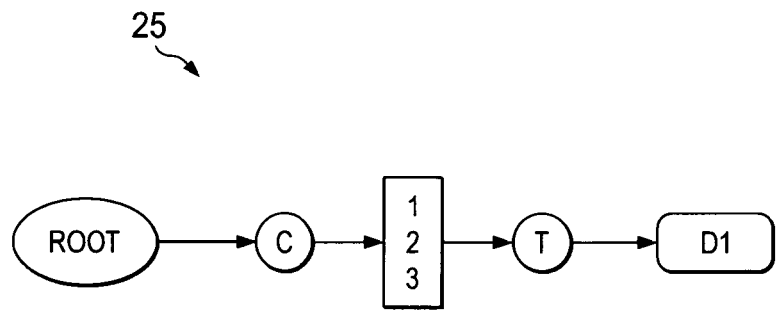

Turning to some example embodiments, FIGS. 19A-19G are simplified schematic diagrams that are illustrative of some of these concepts. FIG. 19A illustrates how to build a state table in an example implementation 15. This example includes an expression list, along with a representation of a simple single byte tree. Also provided in this example is a root, along with a descriptor. Example 1 is a simple case in which a number of expressions (t, g, etc.) are mapped to a number of descriptors (D1, in this case). FIG. 19B illustrates a second example 25, which depicts a character map with an accompanying expression list. This representation is of a single expression with a multiple byte character class '123'. Note that each descriptor can include one or more rules (and/or actions) such that when the given descriptor is encountered, some action occurs based on that state.

Figure 19C:
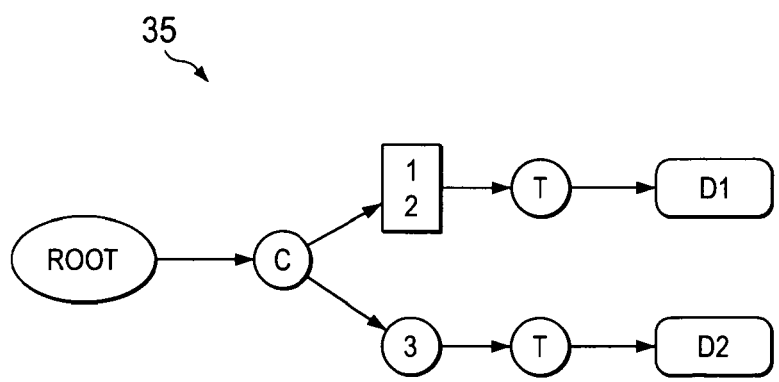
Figure 19D:
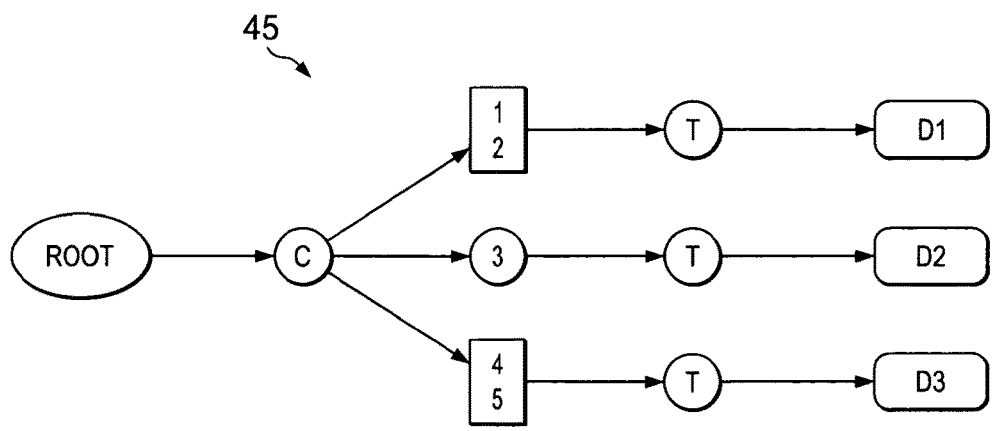
Figure 19E:
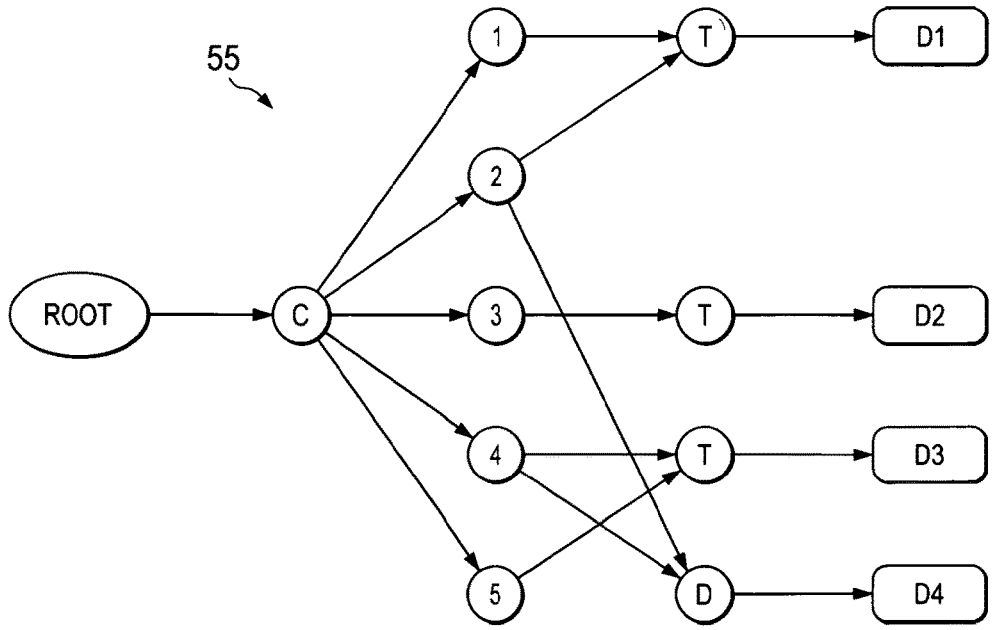
Figure 19F:
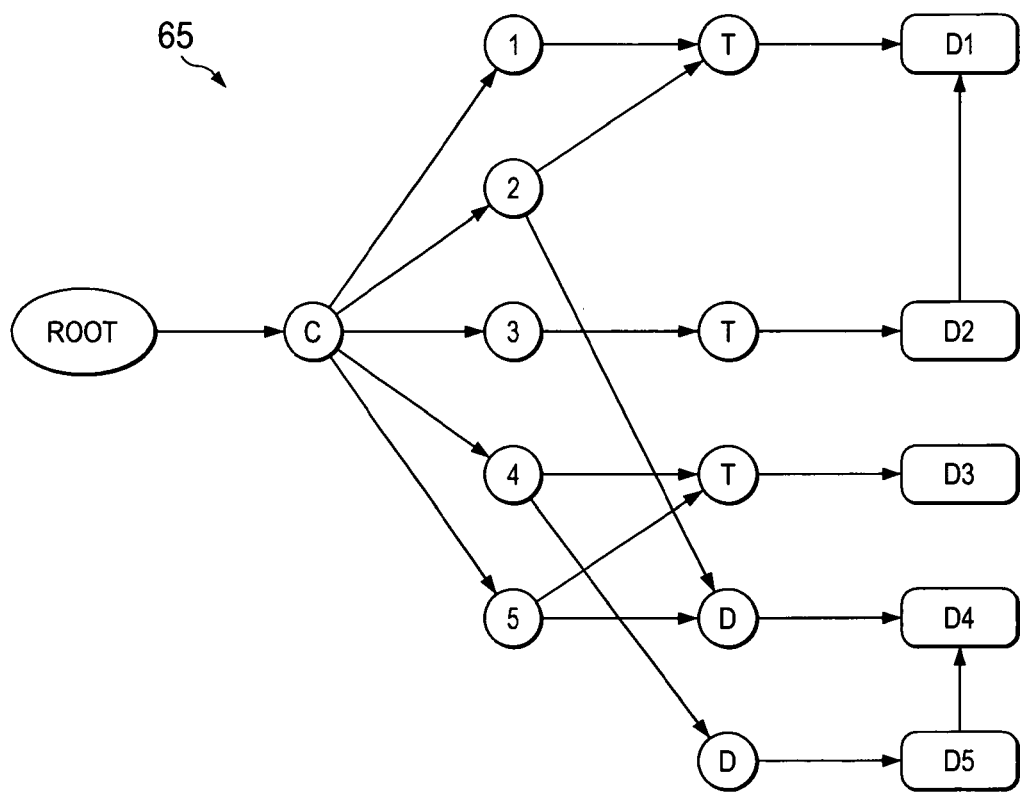
Figure 19G:
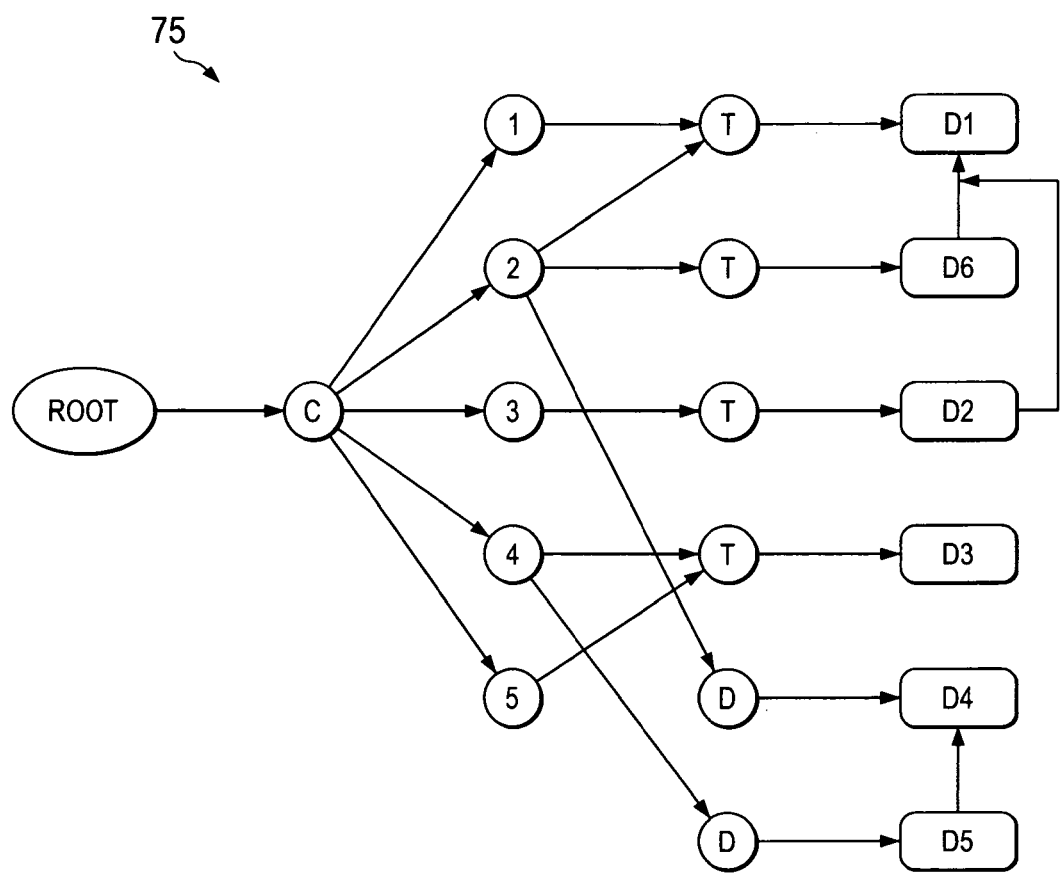

The example of FIG. 19C depicts a third example 35, which demonstrates the addition of state 'c', where the multi-byte character class '123' has been split and two descriptors have been linked. In essence, in this particular example, C3 and 't' have been added to the system. The example of FIG. 19D depicts a fourth example 45 in which a multi-byte character class '45' has been linked to 'c.' The example of FIG. 19E depicts a fifth example 55 in which states '12' and '45' have been split, along with an addition of 'd' to state D4. Note that the bifurcation still occurs, as the '2' and '4' states still map through 't.' The example of FIG. 19F depicts a fifth example 65 in which there is a replication of the state 4 'd' for the addition of the linked descriptor 'D5' to 'D4.' The example of FIG. 19G depicts a sixth example 75 in which there is the addition of a descriptor 'D6' to an existing expression 'c2t' through the replication of a 't' state and descriptor linking.

Note that when doing the mappings, you will see cross states such that the number of repetitive states is minimized. Furthermore, because each descriptor is added to the head of the architecture, previous descriptors can be leveraged without having those descriptors occupy additional space. Thus, FIG. 19G is illustrative of state reduction, as multiple items are being mapped to D1 in an efficient manner. Hence, one part of the present invention involves constructing the tree, as outlined above. A second part of the present invention involves minimizing the tree (or confining the tree) to a small state.

Figure 19H:
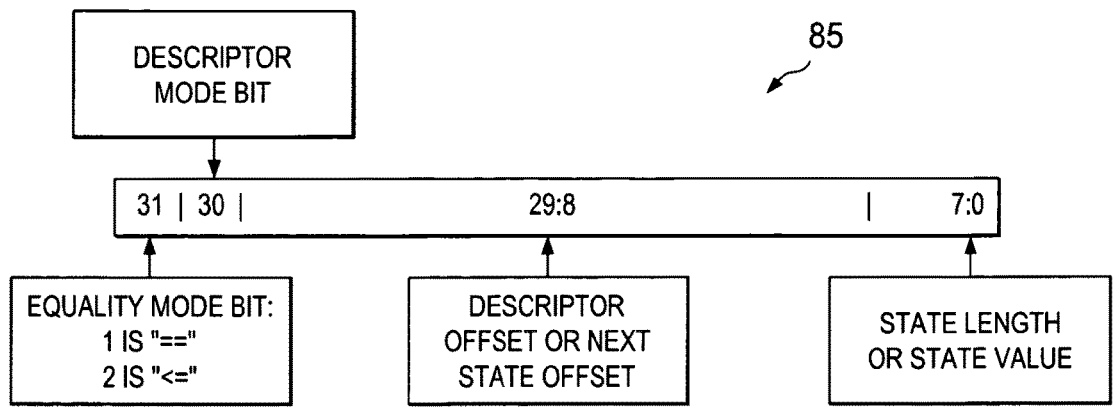
Figure 19I:
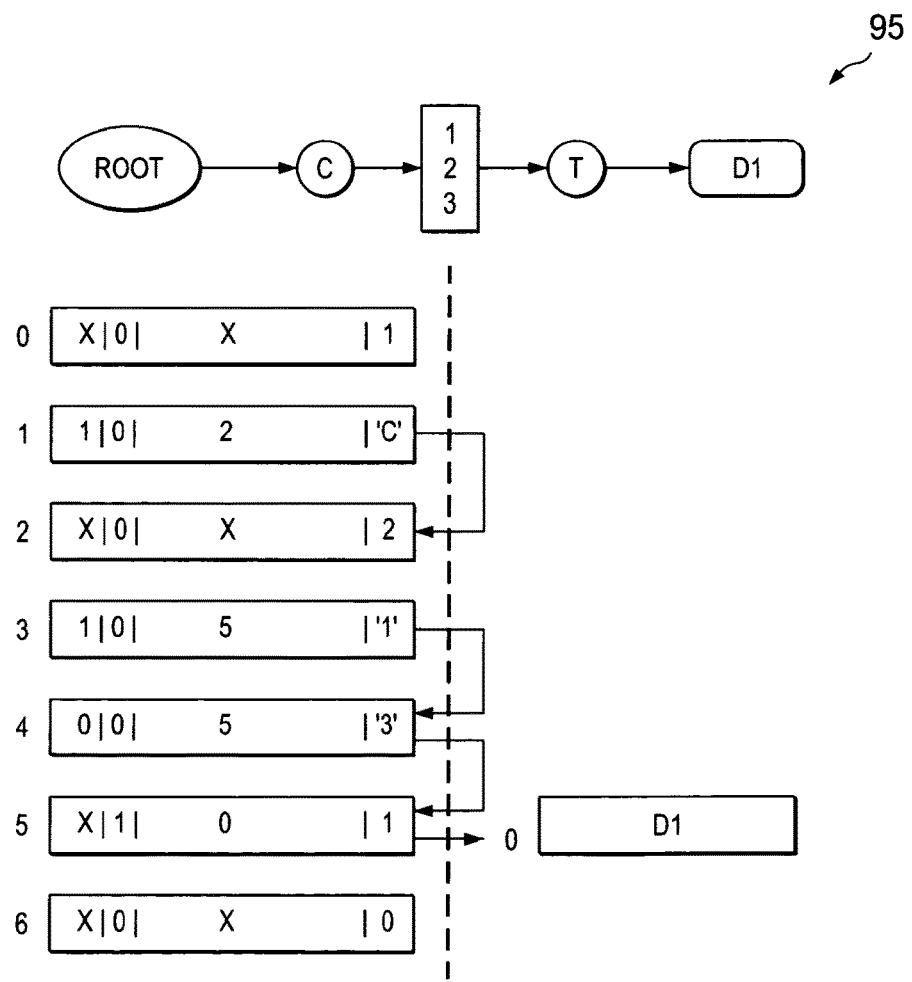

FIG. 19H is a simplified schematic diagram illustrating an example state for a compressed format 85 to be used in example embodiments of the present invention. The descriptor includes a mode bit, an equality mode bit, a descriptor offset, and a state length or state value. Turning to the next figure, FIG. 19I is a simplified schematic diagram illustrating a state list 95 that maps to a descriptor. In this figure, a state list and a descriptor list are being mapped for a specific instance of D1. Note that the structure becomes increasingly complex and rich, but it remains relatively small. Note that these items can be grouped by level, where the first letter descriptors and the first letter states are grouped in the front of this particular map. The second ones are grouped next, the third ones are grouped next, etc. That can be done because, in the context of walking a tree, we only branch out further in memory (for example, in conjunction with memory caching), if we navigate into the expression successfully. This is part of the performance advantage of example embodiments of the present invention.

Note that with the numerous examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding discussions illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

In one non-limiting example implementation of one embodiment of the present invention, an article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable medium suitable for storing electronic instructions. In one embodiment, a capture system is an appliance constructed using commonly available computing equipment and storage systems capable of supporting the software requirements.

One example computing system of example embodiments of the present invention includes: 1) one or more processors; 2) a memory control hub (MCH); 3) a system memory (of which different types exist such as DDR RAM, EDO RAM, etc,); 4) a cache; 5) an I/O control hub (ICH); 6) a graphics processor; 7) a display/screen (of which different types exist such as Cathode Ray Tube (CRT), Thin Film Transistor (TFT), Liquid Crystal Display (LCD), Digital Light Processing (DLP), Organic LED (OLED), etc.; and 8) one or more I/O and storage devices. The one or more processors execute instructions in order to perform whatever software routines the computing system implements. The instructions frequently involve some sort of operation performed upon data. Both data and instructions can be stored in a system memory and/or the cache. A cache is typically designed to have shorter latency times than the system memory. For example, a cache might be integrated onto the same silicon chip(s) as the processor(s) and/or constructed with faster SRAM cells, while a system memory might be constructed with slower DRAM cells. By tending to store, more frequently used instructions and data in the cache, as opposed to the system memory, the overall performance efficiency of the computing system improves.

The system memory can be deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into a system memory prior to their being operated upon by the one or more processor(s) in the implementation of a software program. Similarly, data that a software program determines should be sent from the computing system to an outside entity through one of the computing system interfaces, or stored into an internal storage element, is often temporarily queued in a system memory prior to its being transmitted or stored.

The ICH can be responsible for ensuring that such data is properly passed between the system memory and its appropriate corresponding computing system interface (and internal storage device if the computing system is so designed). The MCH can be responsible for managing the various contending requests for the system memory access amongst the processor(s), interfaces, and internal storage elements that may proximately arise in time with respect to one another.

One or more I/O devices are also implemented in a typical computing system. I/O devices generally are responsible for transferring data to and/or from the computing system or, for large-scale non-volatile storage within the computing system (e.g., hard disk drive). The ICH has bi-directional point-to-point links between itself and the observed I/O devices. A capture program, classification program, a database, a file store, an analysis engine, and/or a graphical user interface may be stored in a storage device or devices or in memory. In the foregoing Specification, the invention has been described with reference to specific example embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Thus, a capture system and a document/content registration system have been described. In the forgoing description, various specific values were given names, such as "objects," and various specific modules, such as the "registration module" and "signature database" have been described. However, these names are merely to describe and illustrate various aspects of the present invention, and in no way limit the scope of the present invention. Furthermore, various modules may be implemented as software or hardware modules, combined, or without dividing their functionalities into modules at all. The present invention is not limited to any modular architecture either in software or in hardware, whether described above or not.

Although the present invention has been described in detail with reference to particular arrangements and configurations, these example configurations and arrangements may be changed significantly without departing from the scope of the present invention. In addition, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. At least one machine readable medium that includes code for execution and when executed, causes at least one processor to:
   receive one or more documents and a state request that includes a state, wherein the state in compressed notation is organized into an ordered set with one or more Boolean qualifiers for a bisection lookup, and wherein one or more of the Boolean qualifiers identify whether an element is evaluated using a qualification.

2. The at least one machine readable medium of claim 1, wherein when executed, the code causes the at least one processor to:
   evaluate the state request.

3. The at least one machine readable medium of claim 1, wherein when executed, the code causes the at least one processor to:
   determine whether the state exists in a translation dictionary for the state request, and wherein the state is reproduced if it is not in the dictionary and a new state is added to the dictionary.

4. The at least one machine readable medium of claim 3, wherein when executed, the code causes the at least one processor to:
   compile a rule, based on the state, into a given state table, wherein the rule affects data management for one or more documents that satisfy the rule.

5. The at least one machine readable medium of claim 3, wherein the state represents a final state such that a descriptor is added to the state.

6. The at least one machine readable medium of claim 3, wherein during compilation, state expression descriptors are chained with a linked list.

7. The at least one machine readable medium of claim 3, wherein a plurality of expressions are mapped to a plurality of descriptors, and wherein one or more descriptors include one or more rules such that when a given descriptor is encountered an action occurs based on a state associated with the descriptor.

8. The at least one machine readable medium of claim 3, wherein a plurality of states are mapped to a plurality of descriptors such that one or more cross states are produced to minimize a number of repetitive states.

9. The at least one machine readable medium of claim 3, wherein when executed, the code causes the at least one processor to:
   construct a tree that includes the state, wherein the tree is used to generate a concept based on the tree, and wherein the concept is applied to a rule that affects data management for one or more documents that satisfy the rule.

10. The at least one machine readable medium of claim 9, wherein the tree is used to identify locations within a document set where one or more words are present, and wherein the branch point is a word or a combination of words.

11. The at least one machine readable medium of claim 1, wherein the state is compressed such that an associated descriptor includes a mode bit, an equality mode bit, a descriptor offset, and a state value.

12. A method, comprising:
    receiving one or more documents and a state request that includes a state, wherein the state in compressed notation is organized into an ordered set with one or more Boolean qualifiers for a bisection lookup, and wherein one or more of the Boolean qualifiers identify whether an element is evaluated using a qualification.

13. The method of claim 12, further comprising:
    evaluating the state request.

14. The method of claim 12, further comprising:
    determining whether the state exists in a translation dictionary for the state request, and wherein the state is reproduced if it is not in the dictionary and a new state is added to the dictionary.

15. The method of claim 14, further comprising:
    compiling a rule, based on the state, into a given state table, wherein the rule affects data management for one or more documents that satisfy the rule.

16. The method of claim 14, wherein the state represents a final state such that a descriptor is added to the state.

17. The method of claim 14, wherein a plurality of expressions are mapped to a plurality of descriptors, and wherein one or more descriptors include one or more rules such that when a given descriptor is encountered an action occurs based on a state associated with the descriptor.

18. The method of claim 14, wherein when executed, the code causes the at least one processor to:
    constructing a tree that includes the state, wherein the tree is used to generate a concept based on the tree, and wherein the concept is applied to a rule that affects data management for one or more documents that satisfy the rule.

19. An apparatus, comprising:
    a memory element coupled to at least one processor; and
    a flow processing module including a set of executable instructions stored in the memory element, wherein the executable instructions, when executed by the at least one processor, are to:
       receive one or more documents and a state request that includes a state, wherein the state in compressed notation is organized into an ordered set with one or more Boolean qualifiers for a bisection lookup, and wherein one or more of the Boolean qualifiers identify whether an element is evaluated using a qualification.

20. The apparatus of claim 19, wherein the executable instructions of the flow processing module, when executed by the at least one processor, are to:

determine whether the state exists in a translation dictionary for the state request, and wherein the state is reproduced if it is not in the dictionary and a new state is added to the dictionary.

* * * * *